US012155489B2

(12) United States Patent
Wang et al.

(10) Patent No.: US 12,155,489 B2
(45) Date of Patent: Nov. 26, 2024

(54) PROCEDURES FOR HIGH EFFICIENCY ACKNOWLEDGEMENT TRANSMISSION

(71) Applicant: InterDigital Patent Holdings, Inc., Wilmington, DE (US)

(72) Inventors: Xiaofei Wang, North Caldwell, NJ (US); Guodong Zhang, Woodbury, NY (US); Joseph S. Levy, Merrick, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/217,285

(22) Filed: Jun. 30, 2023

(65) Prior Publication Data

US 2023/0344564 A1    Oct. 26, 2023

Related U.S. Application Data

(63) Continuation of application No. 17/229,379, filed on Apr. 13, 2021, now abandoned, which is a (Continued)

(51) Int. Cl.
  *H04L 1/1829* (2023.01)
  *H04L 1/1607* (2023.01)
  (Continued)

(52) U.S. Cl.
  CPC .......... *H04L 1/1854* (2013.01); *H04L 1/1635* (2013.01); *H04L 1/1664* (2013.01);
  (Continued)

(58) Field of Classification Search
  CPC ... H04L 1/1854; H04L 1/1635; H04L 1/1664; H04L 1/1848; H04L 1/18641;
  (Continued)

(56) References Cited

U.S. PATENT DOCUMENTS 7,391,746 B2   6/2008   Morimoto et al.
7,882,412 B2   2/2011   Nanda
(Continued)

FOREIGN PATENT DOCUMENTS

CN   102752867 A   10/2012
CN   103516461 B   2/2019
(Continued)

OTHER PUBLICATIONS

Aboul-Magd, "802.11 HEW SG Proposed PAR," IEEE 802.11-14/0165r0 (Jan. 22, 2014).
(Continued)

*Primary Examiner* — Samina F Choudhry
(74) *Attorney, Agent, or Firm* — VOLPE KOENIG

(57) ABSTRACT

A method performed by a station (STA) for operating in a wireless local area network (WLAN) is provided. The method includes communicating, in an operation mode, with devices in the WLAN including another STA and transmitting, to the another STA, one or more of a data frame or a management frame including a medium access control (MAC) header. The MAC header includes an operation mode field indicating a change in one or more parameters of the operation mode. The method includes transmitting or receiving, based on a determination that the indicated change in the one or more parameters of the operation mode has taken effect, a frame to or from the another STA in accordance with the indicated change in the one or more parameters of the operation mode.

18 Claims, 14 Drawing Sheets

Related U.S. Application Data continuation of application No. 15/766,201, filed as application No. PCT/US2016/056266 on Oct. 10, 2016, now Pat. No. 10,979,183.

(60) Provisional application No. 62/239,691, filed on Oct. 9, 2015.

(51) Int. Cl.
*H04W 52/02* (2009.01)
*H04L 1/00* (2006.01)

(52) U.S. Cl.
CPC .......... *H04L 1/1848* (2013.01); *H04L 1/1864* (2013.01); *H04W 52/0216* (2013.01); *H04W 52/0219* (2013.01); *H04L 2001/0093* (2013.01); *H04L 1/1671* (2013.01); *Y02D 30/70* (2020.08)

(58) Field of Classification Search
CPC ...... H04L 2001/0093; H04W 52/0216; H04W 52/0219
See application file for complete search history.

(56) References Cited

U.S. PATENT DOCUMENTS

| | | | |
|---|---|---|---|
| 7,953,167 | B2 | 5/2011 | Ode et al. |
| 8,619,658 | B2 | 12/2013 | Sammour et al. |
| 9,042,313 | B2 | 5/2015 | Adachi et al. |
| 9,137,781 | B2 | 9/2015 | Lee et al. |
| 9,338,789 | B2 | 5/2016 | Wang et al. |
| 9,451,637 | B2 | 9/2016 | Kim et al. |
| 9,491,700 | B2 | 11/2016 | Choi et al. |
| 9,509,463 | B2 | 11/2016 | Bao et al. |
| 9,609,665 | B2 | 3/2017 | Choi et al. |
| 9,699,667 | B2 | 7/2017 | Sampath et al. |
| 9,699,734 | B2 | 7/2017 | Seok et al. |
| 9,730,159 | B2 | 8/2017 | Choi et al. |
| 9,769,758 | B2 | 9/2017 | Kim et al. |
| 9,887,821 | B2 | 2/2018 | Seok |
| 10,123,266 | B2 | 11/2018 | Wang et al. |
| 10,264,599 | B2 | 4/2019 | Zhang et al. |
| 10,291,350 | B2 | 5/2019 | Lee et al. |
| 10,979,183 | B2 | 4/2021 | Wang et al. |
| 2007/0195787 | A1 | 8/2007 | Alnuweiri et al. |
| 2007/0230493 | A1 | 10/2007 | Dravida et al. |
| 2011/0090855 | A1 | 4/2011 | Kim |
| 2011/0237283 | A1 | 9/2011 | Shan et al. |
| 2012/0314697 | A1 | 12/2012 | Noh et al. |
| 2013/0258928 | A1 | 10/2013 | Wong et al. |
| 2014/0071873 | A1 | 3/2014 | Wang et al. |
| 2014/0112226 | A1 | 4/2014 | Jafarian et al. |
| 2014/0211678 | A1 | 7/2014 | Jafarian et al. |
| 2014/0254408 | A1 | 9/2014 | Shukla et al. |
| 2014/0307602 | A1 | 10/2014 | Seok |
| 2014/0328236 | A1 | 11/2014 | Merlin et al. |
| 2014/0376433 | A1 | 12/2014 | Li et al. |
| 2015/0063190 | A1 | 3/2015 | Merlin et al. |
| 2015/0063318 | A1 | 3/2015 | Merlin et al. |
| 2015/0146654 | A1 | 5/2015 | Chu et al. |
| 2015/0173014 | A1 | 6/2015 | Lee et al. |
| 2015/0189592 | A1 | 7/2015 | Jafarian et al. |
| 2015/0244619 | A1 | 8/2015 | Zheng et al. |
| 2015/0327262 | A1 | 11/2015 | Kwon et al. |
| 2016/0105836 | A1* | 4/2016 | Seok .................... H04W 72/23 370/331 |
| 2016/0269993 | A1 | 9/2016 | Ghosh |

FOREIGN PATENT DOCUMENTS

| | | | | |
|---|---|---|---|---|
| CN | 104066198 | B | 8/2019 | |
| WO | 2003077457 | A1 | 9/2003 | |
| WO | 06/041891 | | 4/2006 | |
| WO | 10/099491 | | 9/2010 | |
| WO | 15/035210 | | 3/2015 | |
| WO | 15/050995 | | 4/2015 | |
| WO | 15/081179 | | 6/2015 | |
| WO | 15/134553 | | 9/2015 | |
| WO | 16/100631 | | 6/2016 | |
| WO | WO-2016104886 | A1 * | 6/2016 | ............ H04B 7/26 |
| WO | 16/140546 | | 9/2016 | |

OTHER PUBLICATIONS

Aboul-Magd, "802.11 HEW SG Proposed PAR," IEEE 802.11-14/0165r1 (Mar. 17, 2014).
Aboul-Magd, "IEEE 802.11 HEW SG Proposed CSD," IEEE 802.11-14/0169r0 (Jan. 22, 2014).
Aboul-Magd, "IEEE 802.11 HEW SG Proposed CSD," IEEE 802.11-14/0169r1 (Mar. 18, 2014).
Ahn et al., "Regarding UL MU Protection," IEEE 802.11-15/1117r1 (Sep. 15, 2015).
Asterjadhi et al., "Scheduled Trigger Frames—Follow Up," IEEE 802.11-15/1319r0 (Nov. 8, 2015).
Asterjadhi et al., "Scheduled Trigger Frames," IEEE 802.11-15/0880r2 (Jul. 4, 2015).
Chen et al., "MAC and PHY Proposal for 802.11af," IEEE 802.11-10/0258r0 (Mar. 2010).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHZ, IEEE P802.11ac/D1.0 (May 2011).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 6: Enhancements for High Efficiency Wlan, IEEE P802.11ax/D0.5 (Sep. 2016).
Halasz, "Sub 1 GHz license-exempt PAR and 5C," IEEE P802.11 Wireless LANs, IEEE 802.11-10/0001r13 (Jul. 2010).
Hedayat et al., "On MU Aggregation Mechanisms for 11ax," IEEE 802.11-14/1232r1 (Sep. 15, (2014).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
LG Electronics Inc., "Load Management on E-DCH resource Release," 3GPP TSG-RAN WG2 #61bis, R2-081829, Shenzhen, China (Mar. 31-Apr. 4, 2008).
Merlin et al., "Multi-STA Acknowledgement," 802.11-15/0366r1 (Mar. 9, 2015).
Park, "Proposed Specification Framework for TGah," IEEE 802.11-11/1137r6 (Mar. 12, 2012).
Perahia et al., "HEW Usage Scenarios and Applications," IEEE 802.11-13/0514r0 (May 2013).

(56) References Cited

OTHER PUBLICATIONS

Stacey, "Specification Framework for TGax," IEEE 802.11-15/0132r2 (Jan. 15, 2015).
Wang et al., "Follow Up for Multi-STA BA for SU Transmissions," IEEE 802.11-16/0028r0 (Jan. 18, 2016).
Wang et al., "TXOP Truncation Enhancement," IEEE 802.11-16/0029r0 (Jan. 18, 2016).
Wong et al., "Proposed TGah Draft Amendment," IEEE 802.11-13/0500r1 (May 13, 2013).

* cited by examiner

PROCEDURES FOR HIGH EFFICIENCY ACKNOWLEDGEMENT TRANSMISSION

CROSS REFERENCE TO RELATED APPLICATIONS

This application is a continuation of U.S. application Ser. No. 17/229,379 filed on Apr. 13, 2021, which is a continuation of U.S. application Ser. No. 15/766,201 filed on Apr. 5, 2018, which issued as U.S. Pat. No. 10,979,183 on Apr. 13, 2021, which is a continuation of the U.S. National Stage, under 35 U.S.C. § 371, of International Application No. PCT/US2016/056266 filed Oct. 10, 2016, which claims the benefit of U.S. Provisional Application No. 62/239,691, filed Oct. 9, 2015, the content of which are hereby incorporated by reference herein.

SUMMARY

Setup and transmission techniques and procedures may be used for high efficiency (HE) acknowledgement transmission in wireless local area network (WLAN) systems. A wireless transmit/receive unit (WTRU) communicating in a WLAN system may use efficient acknowledgement (ACK) setup and transmission procedures in conjunction with other transmission and power saving techniques, such as target wake time/restricted access window (TWT/RAW), power save multi-poll (PSMP) and/or transmission opportunity (TXOP) mechanisms, and operation mode changes. In an example, a WTRU (e.g., an access point (AP)) may transmit a first frame including the following information: an indication that a TWT/RAW period is scheduled; an indication that multi-WTRU block ACK and/or Block ACK (BA) (M-BA) (e.g., multi-station (STA) ACK/BA) will be used by the WTRU for acknowledgement of received frames during the TWT/RAW period; and/or at least one targeted transmission time corresponding to a transmission of at least one multi-WTRU ACK/BA frame. The WTRU may transmit a second frame triggering a start of the TWT/RAW period. The WTRU may receive at least one data frame from at least one WTRU in the WLAN system, wherein the at least one WTRU is allowed to access the wireless medium during the TWT/RAW period. The WTRU may transmit at least one multi-WTRU ACK/BA frame during the at least one targeted transmission time to acknowledge the at least one data frame received from the at least one WTRU. In another example, a method for HE acknowledgement transmission may be performed by a station (STA) in a wireless local area network (WLAN) system. The method may include receiving a downlink (DL) frame indicating a resource allocation for the STA to transmit an uplink (UL) transmission. It may further include transmitting an acknowledgement frame in a single-user (SU) transmission or multi-user (MU) transmission, where the acknowledgement frame includes an indication of an operation mode change.

BRIEF DESCRIPTION OF THE DRAWINGS

A more detailed understanding may be had from the following description, given by way of example in conjunction with the accompanying drawings wherein.

DETAILED DESCRIPTION

Figure 1A:
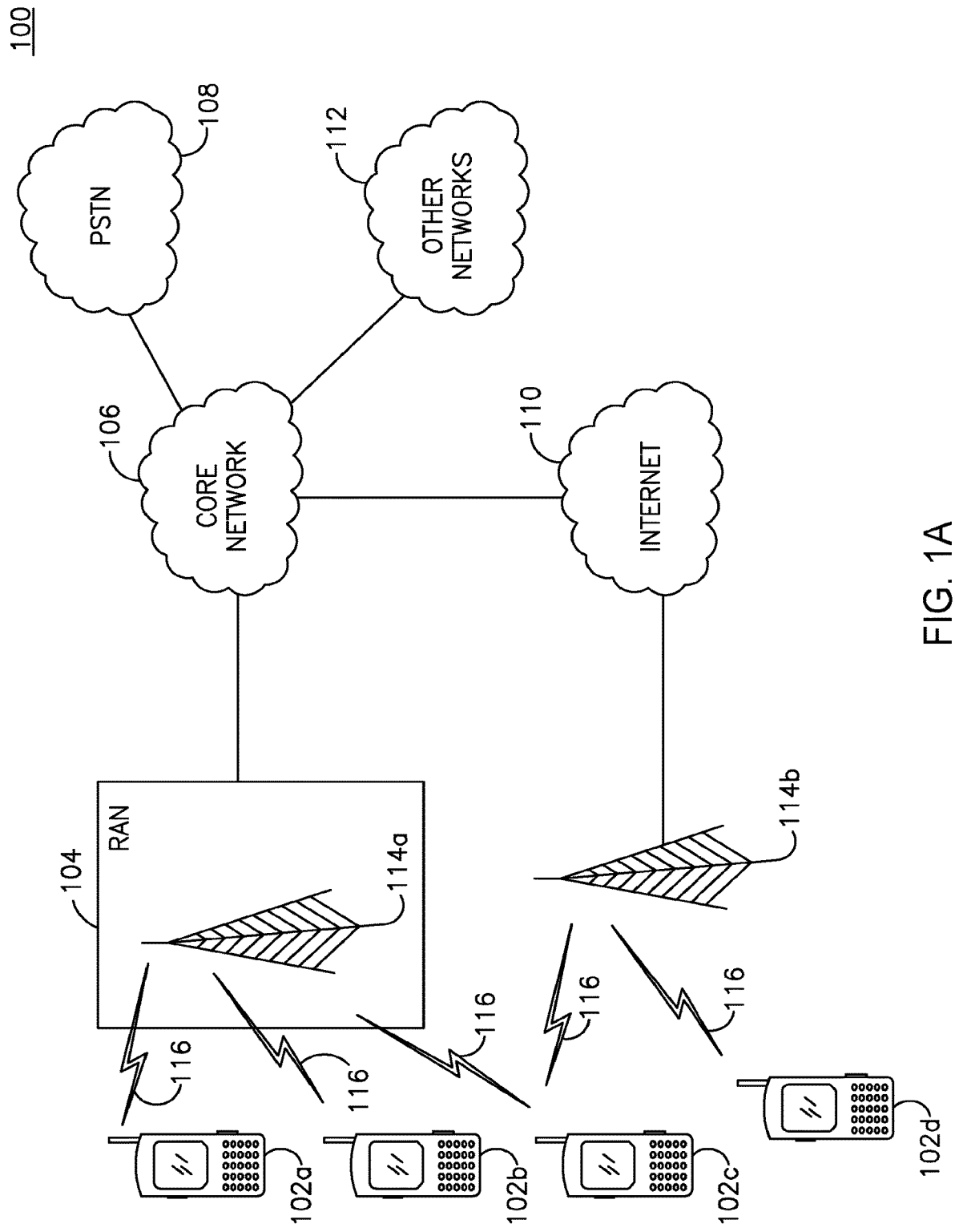
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as Institute of Electrical and Electronic Engineers (IEEE) 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
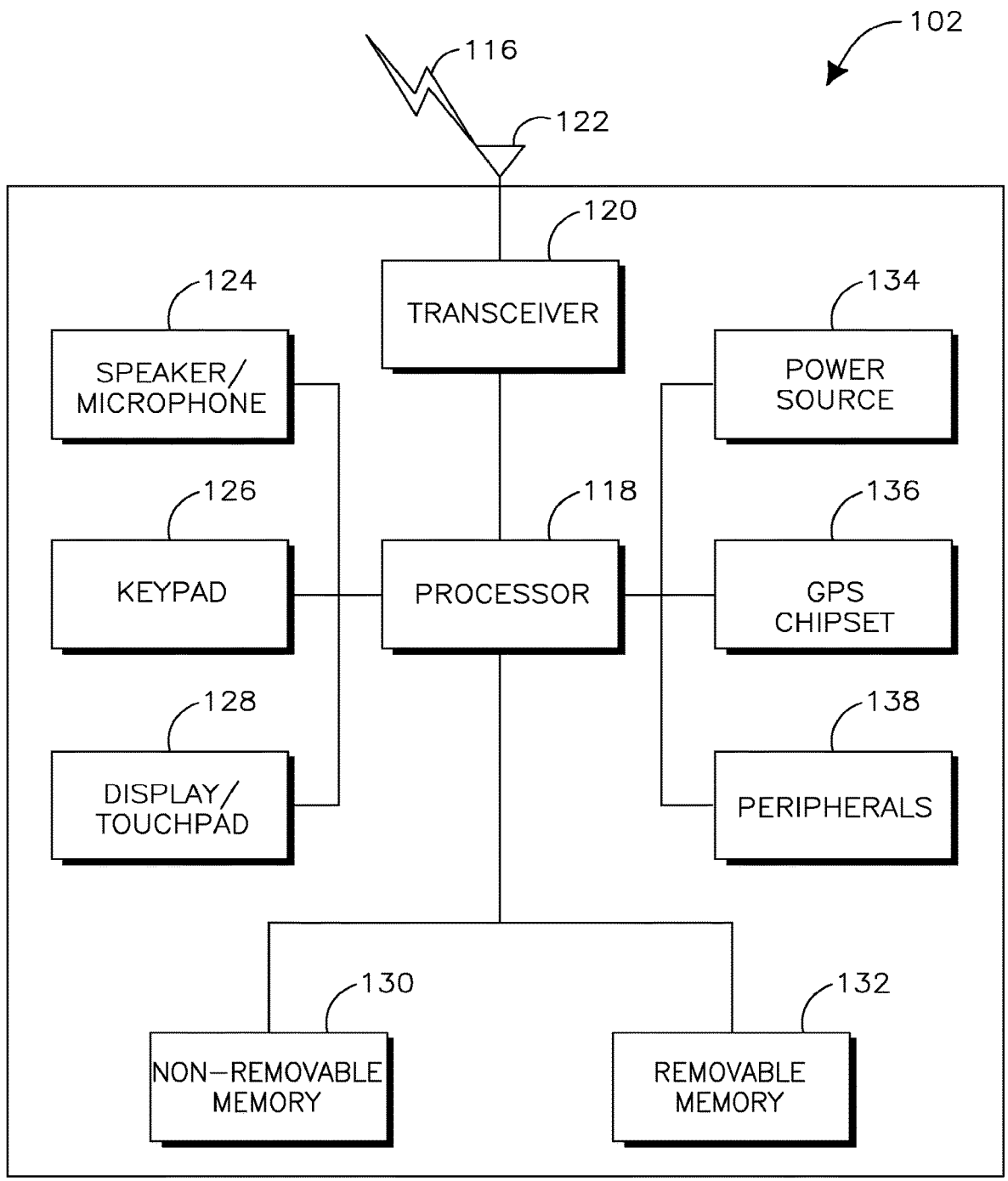
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WT RU 102 may include any number of transmit/receive elements 122. More specifically, the WT RU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth© module, a frequency modulated (FM) radio unit, a digital music player, a media player, a video game player module, an Internet browser, and the like.

Figure 1C:
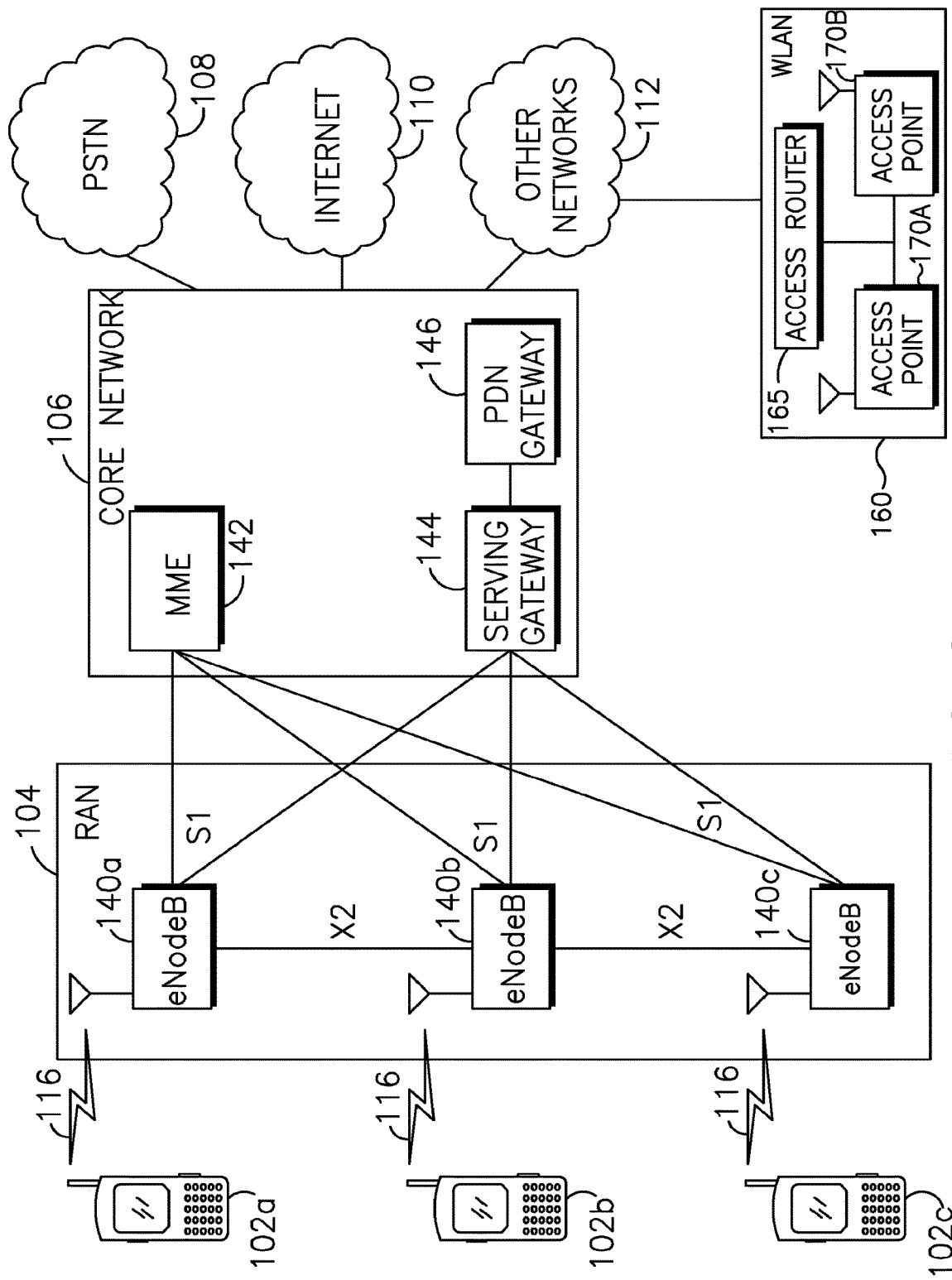
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d. Herein, WTRU and station (STA) in a WLAN may be used interchangeably. A WTRU may be, for example, an AP or a non-AP STA, such that all the examples and figures described herein may equivalently apply to an AP or a non-AP STA. Herein, a WLAN system may be considered a network operating based on an IEEE 802.11 standard. In any of the examples herein, a WLAN may be a high efficiency (HE) WLAN (HEW) system, or any other type of WLAN system.

A WLAN in Infrastructure Basic Service Set (BSS) mode may include, for example, an AP for the BSS and one or more WTRUs (e.g., STAs) associated with the AP within the BSS. The AP may have access or an interface to a Distribution System (DS) or another type of wired/wireless network that carries traffic in and out of the BSS. Traffic to WTRUs that originates from outside the BSS may arrive through the AP and may be delivered to the WTRUs. Traffic originating from WTRUs to destinations outside the BSS may be sent to the AP to be delivered to the respective destinations. Traffic between WTRUs within the BSS may also be sent through the AP, where the source WTRU may send traffic to the AP and the AP may deliver the traffic to the destination WTRU. Such traffic between WTRUs within a BSS may be considered peer-to-peer traffic. Such peer-to-peer traffic may be sent directly between the source and destination WTRUs, for example using a direct link setup (DLS) using an 802.11e DLS or an 802.11z tunneled DLS (TDLS). A WLAN using an Independent BSS (IBSS) mode may not have an AP, and may have WTRUs communicating directly with each other. This mode of communication may be referred to as an ad-hoc mode of communication. Herein, a WTRU may include IEEE 802.11 STAs and/or an AP.

The IEEE 802.11 family of specifications for WLANs continues to evolve to include new and enhanced versions that add features such as higher throughput, extended transmission range, and improved efficiency for example. Some aspects of various 802.11 protocols are described below.

Using the 802.11ac infrastructure mode of operation, an AP may transmit a beacon on a fixed channel, such as the primary channel. This channel may be 20 MHz wide, and may be the operating channel of the BSS. This channel may be used by the WTRUs to establish a connection with the AP. A fundamental channel access mechanism in an 802.11 system is Carrier Sense Multiple Access with Collision Avoidance (CSMA/CA). Using CSMA/CA channel access, every WTRU including the AP may sense the primary channel. If the channel is detected to be busy, the WTRU (including the AP) may back off from accessing the channel. Thus, CSMA/CA multiple may allow only one WTRU to transmit at any given time in a given BSS, thus avoiding collision on the channel.

According to the IEEE 802.11n specification, High Throughput (HT) WTRUs may use a 40 MHz wide channel for communication in addition to other channels, such as a 20 MHz channel (e.g., primary channel). This may be achieved by combining the primary 20 MHz channel, with an adjacent 20 MHz channel to form a 40 MHz wide contiguous channel.

According to the IEEE 802.11ac specification, Very High Throughput (VHT) WTRUs may support 20 MHz, 40 MHz, 80 MHz, and/or 160 MHz wide channels. For example, the 40 MHz and 80 MHz channels may be formed by combining contiguous 20 MHz channels, as in the example of 802.11n. In an example, a 160 MHz channel may be formed by combining eight contiguous 20 MHz channels, or by combining two non-contiguous 80 MHz channels, which may be referred to as an 80+80 configuration. For the 80+80 configuration, the data, after channel encoding, may pass through a segment parser that divides data into two streams. Inverse Fast Fourier transformation (IFFT) and time domain processing may be done on each stream separately. The data streams may be mapped on to and transmitted over the two channels. At the receiver, this 80+80 configuration processing may be reversed to combine the two streams of data, and the combined data may be sent to the media access control (MAC) layer.

Sub 1 GHz modes of operation may be supported by 802.11af, and/or 802.11ah. For the 802.11af and 802.11ah specifications, the channel operating bandwidths and carriers may be reduced relative to those used in 802.11n and 802.11ac, for example. The 802.11af specification may support 5 MHz, 10 MHz and/or 20 MHz bandwidths in the TV White Space (TVWS) spectrum. The 802.11ah specification may support 1 MHz, 2 MHz, 4 MHz, 8 MHz, and/or 16 MHz bandwidths using non-TVWS spectrum. An example use case for the 802.11ah standard is the support of meter and sensor devices in a macro coverage area. Meter and sensor devices may have limited capabilities such as support for limited bandwidths, and may have requirements such as a need for very long battery life.

WLAN systems which support multiple channels, and channel widths, such as 802.11n, 802.11ac, 802.11af, and 802.11ah, may include a channel that is designated as the primary channel. The primary channel may have a bandwidth equal to the largest common operating bandwidth supported by all WTRUs in the BSS. Thus, the bandwidth of the primary channel may be limited by the WTRU, among all WTRUs operating in the BSS, which supports the smallest bandwidth operating mode. In the example of 802.11ah, the primary channel may be 1 MHz wide if there are WTRUs, for example MTC type devices, that only support a 1 MHz mode even if the AP, and other WTRUs in the BSS, may support a 2 MHz, 4 MHz, 8 MHz, 16 MHz, or other channel bandwidth operating modes. Carrier sensing and/or NAV settings may depend on the status of the primary channel. For example, if the primary channel is busy, due to a WTRU supporting only a 1 MHz operating mode transmitting to the AP, then the entire available frequency bands may be considered busy even though to majority of the frequency bands remain idle and available.

The available frequency bands that may be used by 802.11ah are in the following ranges for various countries: 902 MHz to 928 MHz in the United States; 917.5 MHz to 923.5 MHz in Korea; and 916.5 MHz to 927.5 MHz in Japan. The total bandwidth available for 802.11ah is 6 MHz to 26 MHz depending on the country code.

To improve spectral efficiency, the IEEE 802.11ac specification has introduced the concept for downlink multi-user MIMO (MU-MIMO) transmission to multiple WTRU's in the same symbol's time frame, for example, during a downlink OFDM symbol. The potential for the use of downlink MU-MIMO is also currently considered for 802.11 ah. Transmission to multiple WTRUs using downlink MU-MIMO, as it is used in 802.11ac, may be made possible by transmitting packets to multiple WTRUs in a spatially orthogonal manner simultaneously (e.g., using the same symbol timing). However, in this case, all WTRUs involved in MU-MIMO transmission with an AP may use the same channel or band, which in turn may limit the operating bandwidth for the BSS to the smallest channel bandwidth that is supported by any one of the WTRUs included in the MU-MIMO transmission with the AP.

WLAN systems using 802.11 may employ acknowledgement (ACK) mechanisms to enable successful delivery of data. Wireless transmissions may be unreliable even though protection mechanisms, such as channel coding and interleaving, may be utilized to protect the transmissions. Therefore, ACK mechanisms for the acknowledgment of correct packet reception may be used in WLAN systems. A WTRU/AP that successfully receives a data frame addressed to itself may immediately send a positive acknowledgement (ACK). If a WTRU/AP transmitting a frame does not receive an ACK corresponding to the frame within a prescribed amount of time, the WTRU/AP may assume that the data frame was not received correctly at the destination and may retransmit the data frame. Not all data frames in a WLAN system may be acknowledged in this way.

Block acknowledgement (BA) mechanisms were introduced in the 802.11e specification as a way of making ACK of multiple frames more efficient. BA mechanisms may improve system efficiency by allowing the recipient of multiple frames to transmit a single block ACK (BA) to acknowledge a block of data frames. BA mechanisms may also reduce overhead because the preambles and headers may be sent once for multiple ACKs. BA mechanisms include immediate BA, providing a more immediate acknowledgement, and delayed BA, which may be used for example when some delay is tolerated.

The 802.11ah specification proposes a short ACK packet format. The short ACK packet format may only include short training fields (STFs), long training fields (LTFs) and signal (SIG) fields. Frame aggregation mechanisms are used in WLAN systems to reduce overhead by sending (i.e., aggregating) two or more data frames in a single transmission. For example, WLAN systems may employ short packet aggregation mechanisms to aggregate short data packets in a single transmission. Thus, multiple "short" ACKs using the short ACK packet format may be transmitted using short packet aggregation mechanisms.

WLAN systems may employ single user (SU) aggregation mechanisms, such as aggregated medium access control (MAC) protocol data unit (A-MPDU) and aggregated MAC service data unit (A-MSDU). Less is defined in 802.11 specifications in terms of multi-user (MU) aggregation mechanisms. For example, the 802.11ac specification proposes downlink (DL) MU-MIMO, which is a MU aggregation method that may be limited to sending polled ACKs individually in the UL direction. Thus, DL MU-MIMO adds overhead, especially for shorter packets such as short ACKs. Additionally, the 802.11 specifications may not provide for MU ACK/BA aggregation in the DL direction.

The IEEE 802.11 High Efficiency WLAN (HEW) Study Group (SG) was created to develop future WLAN systems, and the 802.11ax specification is being developed for such WLAN systems. A goal of the HEW SG and the 802.11ax specification is to improve the average throughput per user and to implement mechanisms to serve more users in a consistent and reliable manner in the present of multiple users in future WLAN systems. For example, the HEW SG is exploring the scope and purpose of 802.11 specifications to enhance the quality of service that all users may experience for a broad spectrum of wireless users in many usage scenarios, including high-density scenarios in the 2.4 GHz and 5 GHz band. Use cases that may support dense deployments of APs and WTRUs, and associated Radio Resource Management (RRM) technologies, are being considered by the HEW SG.

Potential applications being considered for WLAN systems may include, but are not limited to include, the following emerging usage scenarios: data delivery for stadium events; high user density scenarios such as train stations and/or enterprise/retail environments; evidence for an increased dependence on video delivery; and/or wireless services for medical applications.

Based on a Project Authorization Request (PAR) and Criteria for Standards Development (CSD) developed in the HEW SG, the IEEE Standard Board approved the IEEE 802.11ax Task Group (TGax) to study HE WLAN systems and develop the 802.11ax specification. For example, contributions from studies performed by the TGax have shown that the measured traffic for a variety of applications have a large likelihood for short packets, and there are network applications that may also generate short packets. Examples of applications that generate short packets, include, but are not limited to, the following: virtual office; transmission control protocol (TPC) ACK; video streaming ACK; device/controller (e.g., mice, keyboards, and/or game controls) functions; access commands such as probe request and/or response; network selection such as probe requests and/or access network query protocol (ANQP); and/or network management such as control frames, for example.

The 802.11ax specification may support MU features including UL and/or DL OFDMA, and/or UL and/or DL MU-MIMO. For example, such MU communications may support mechanisms for multiplexing DL ACKs sent in response to UL MU transmissions. WLAN systems based on certain 802.11 specifications may have large overhead and/or delay for short packet and/or short payloads. Thus, approaches and mechanisms are described herein that may enhance MAC efficiency, reduce medium access overhead, and/or reduce delay in WLAN systems (based on the 802.11ax specification, for example) for transmission of short packets/bursts. The approaches described herein include effective aggregation schemes for ACK and/or other feedback information in the context of MU communications including, but not limited to, DL and UL OFDMA and DL and UL MU-MIMO. The approaches described herein are designed to effectively allow for simultaneous MU short packet transmissions.

Figure 2:
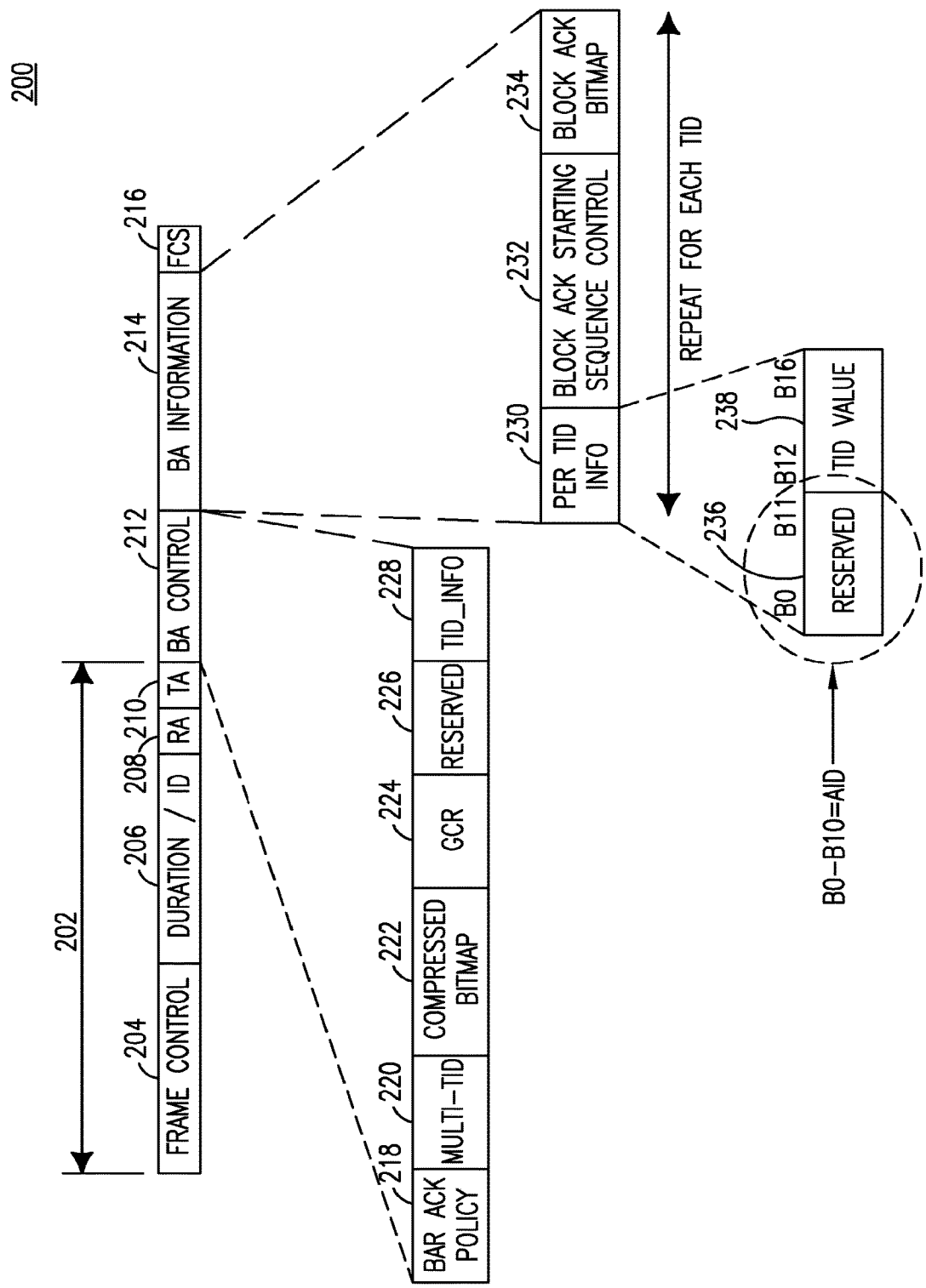
FIG. 2 shows a frame format of an example multi-wireless transmit/receive unit (WTRU) block acknowledgement (BA) (M-BA) control frame.
Figure 3:
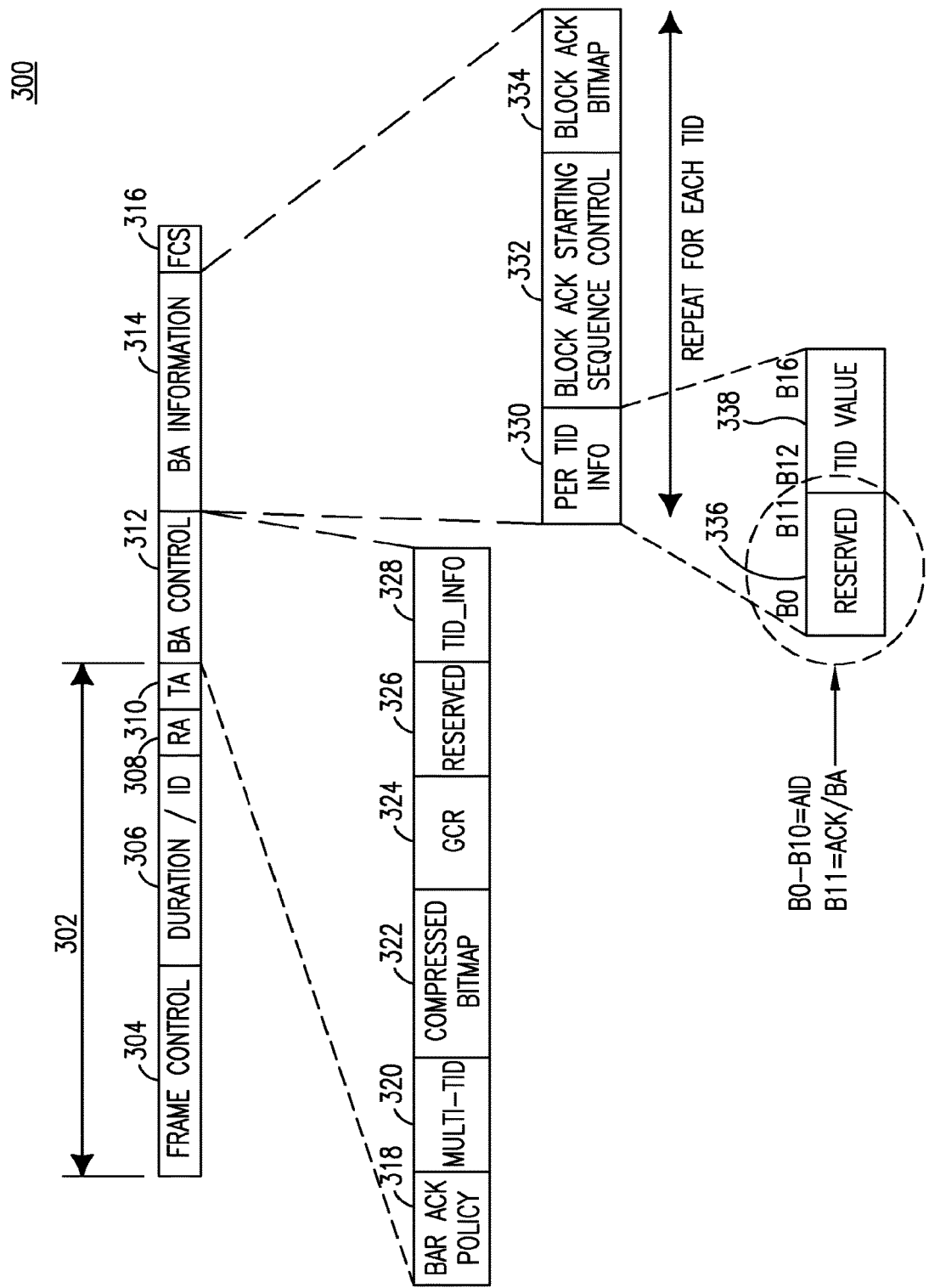
FIG. 3 shows a frame format of another example multi-WTRU BA (M-BA) control frame.

The 802.11ax specification defines a framework for using a multi-WTRU (e.g., multi-STA) Block ACK (M-BA) control frame to acknowledge multiple WTRUs after UL MU transmission. FIGS. 2 and 3 shown example formats for multi-WTRU Block ACK (M-BA) control frames. The examples in FIGS. 2 and 3 may include ACK and or BA information (e.g., multi-WTRU ACK/BA). The examples described herein may apply and refer interchangeably to, but are not limited to, any of the following types of acknowledgment: a multi-WTRU Block ACK; a multi-STA Block ACK (M-BA); a multi-WTRU BA; a multi-STA BA; a multi-WTRU ACK/BA; and/or a multi-STA ACK/BA. For example, a multi-WTRU ACK/BA frame may include only ACK packet(s), or BA packet(s), or both ACK and BA packets.

FIG. 2 shows a frame format of an example multi-WTRU BA frame 200. The multi-WTRU BA frame 200 may be defined by modifying a multi-traffic identifier (multi-TID) BA frame format, for example. The multi-WTRU BA frame 300 may include a MAC header 202. The multi-WTRU BA frame 200 may include, but is not limited to include, any of the following fields: a frame control field 204 (e.g., 2 octets); a duration and/or identification (ID) field 206 (e.g., 2 octets); a receiving WTRU address (RA) field 208 (e.g., 6 octets); a transmitting WTRU address (TA) field 210 (e.g., 6 octets); a BA control field 212 (e.g., 2 octets); a BA information field 214 (e.g., variable length); and/or a frame check sequence (FCS) 216 (e.g., 4 octets). The BA control field 212 may include an indication that the frame 200 is a multi-WTRU BA frame. In another example, an indication that the frame 200 is a multi-WTRU BA frame may be included anywhere in the frame 200. In an example, the BA control field 212 may include 16 bits, B0 to B15. The BA control field 212 may include, but is not limited to include, any of the following subfields: a block acknowledgment request (BAR) ACK policy field 218 (e.g., bit B0); a multi-TID field 220 (e.g., bit B1); a compressed bitmap field 222 (e.g., bit B2); a group code recording (GCR) field 224 (e.g., bit B3); reserved field(s) 226 (e.g., bits B4 to B11); and/or a TID_INFO field 228 (e.g., bits B12-B15).

The BA information field 214 may include information that is repeated for each TID. The repeated information in the BA information field 214 may include, but is not limited to include, any of the following: a per-TID information field 230 (e.g., 2 octets); a BA starting sequence control field 232 (e.g., 2 octets); and/or a BA bitmap field 234 (e.g., 8 octets). Each repeated information for each TID within the BA Information field 214 may be addressed to different WTRU(s). For example, bits B0-B10 of the per-TID information field 230, which may be part of a reserved field 236 (e.g., bits B0-B11), may carry an association identifier (AID) field identifying the intended receiver of the BA Information field 214. The per-TID information field 230 may include a TID value field 238 (e.g bits B12 to B16).

FIG. 3 shows a frame format of another example multi-WTRU BA frame 300. The multi-WTRU BA frame 300 may be defined by modifying a multi-TID BA frame format, for example. The multi-WTRU BA frame 300 may include a MAC header 302. The multi-WTRU BA frame 300 may include, but is not limited to include, any of the following fields: a frame control field 304 (e.g., 2 octets); a duration and/or ID field 306 (e.g., 2 octets); an RA field 308 (e.g., 6 octets); a TA field 310 (e.g., 6 octets); a BA control field 312 (e.g., 2 octets); a BA information field 314 (e.g., variable length); and/or an FCS 316 (e.g., 4 octets). The BA control field 312 may indicate that the frame 300 is a multi-WTRU BA frame. In an example, the BA control field 312 may include 16 bits, B0 to B15. The BA control field 312 may include, but is not limited to include, any of the following subfields: a BAR ACK policy field 318 (e.g., bit B0); a multi-TID field 320 (e.g., bit B1); a compressed bitmap field 322 (e.g., bit B2); a GCR field 324 (e.g bit B3); reserved field(s) 326 (e.g., bits B4 to B11); and/or a TID_INFO field 328 (e.g., bits B12-B15).

The BA information field 314 may include information that is repeated for each TID. The repeated information in the BA information field 314 may include, but is not limited to include, any of the following: a per-TID information field 330 (e.g., 2 octets); a BA starting sequence control field 332 (e.g., 2 octets); and/or a BA bitmap field 334 (e.g., 8 octets). The multi-WTRU BA frame 300 may allow an ACK indication per WTRU, in addition to or instead of a BA. For example, in a BA information field 314, if bit B11 in the per-TID info field 330 is set, then the BA bitmap subfield 334 and/or the BA starting sequence control (SC) subfield 332 may not be present in the BA information field 314. In this scenario, the BA information field 314 may indicate an ACK for the WTRU in B11 of the per-TID info field 330 with AID indicated in bits B0 to B10 in the per-TID info field 330. Bits B0-B10 of the per-TID information field 330 may carry an AID field identifying the intended receiver of the BA information field 314. The per-TID information field 330 may include a TID value field 338 (e.g bits B12 to B16).

In an example scenario, an originator WTRU transmitting to a recipient WTRU may receive delayed acknowledgement from the recipient WTRU, such as a delayed ACK, a delayed BA, a HT-delayed BA extension, a multi-WTRU ACK frame, and/or a multi-WTRU ACK/BA frame, for example. Since each WTRU may have different requirements, and each transmission may contain traffic with diverse QoS requirements, the transmitted packets may have different delay tolerance periods in which to receive an ACK. In another example scenario, a packet may have been buffered for some period of time before it is able to access the medium, which means that packet has already experienced some delay.

Thus, in some of these scenarios, a packet that normally may be acknowledged by, for example, a delayed BA, such that the delayed BA would be within its delay tolerance, may need to be acknowledged immediately by an immediate ACK or BA frame to stay within its delay tolerance. Thus, it may be desirable to provide mechanisms or setup procedures for originating WTRUs to indicate and exchange accurate delay requirements, such as ACK delays and/or delay tolerance, so that the recipient WTRUs may be be able choose the most appropriate acknowledgement options, and so that the recipient WTRUs may transmit ACKs within the corresponding delay tolerance periods.

According to an example, high efficiency ACK setup and high efficiency ACK transmission procedures may be defined to enable the use of high efficiency ACK mechanism in WLAN systems. In any of the examples herein, a WTRU may be an AP or a non-AP. For example, a first WTRU (e.g., an AP or a non-AP WTRU) may setup a new acknowledgement arrangement with a second WTRU (e.g., an AP or a non-AP WTRU). For example, the second WTRU may be the AP that the first WTRU is associated with. In another example, the second WTRU may be another non-AP WTRU. The first WTRU may send an ACK setup request frame to the second WTRU to initiate a new acknowledgement setup procedure with the second WTRU.

Figure 4A:
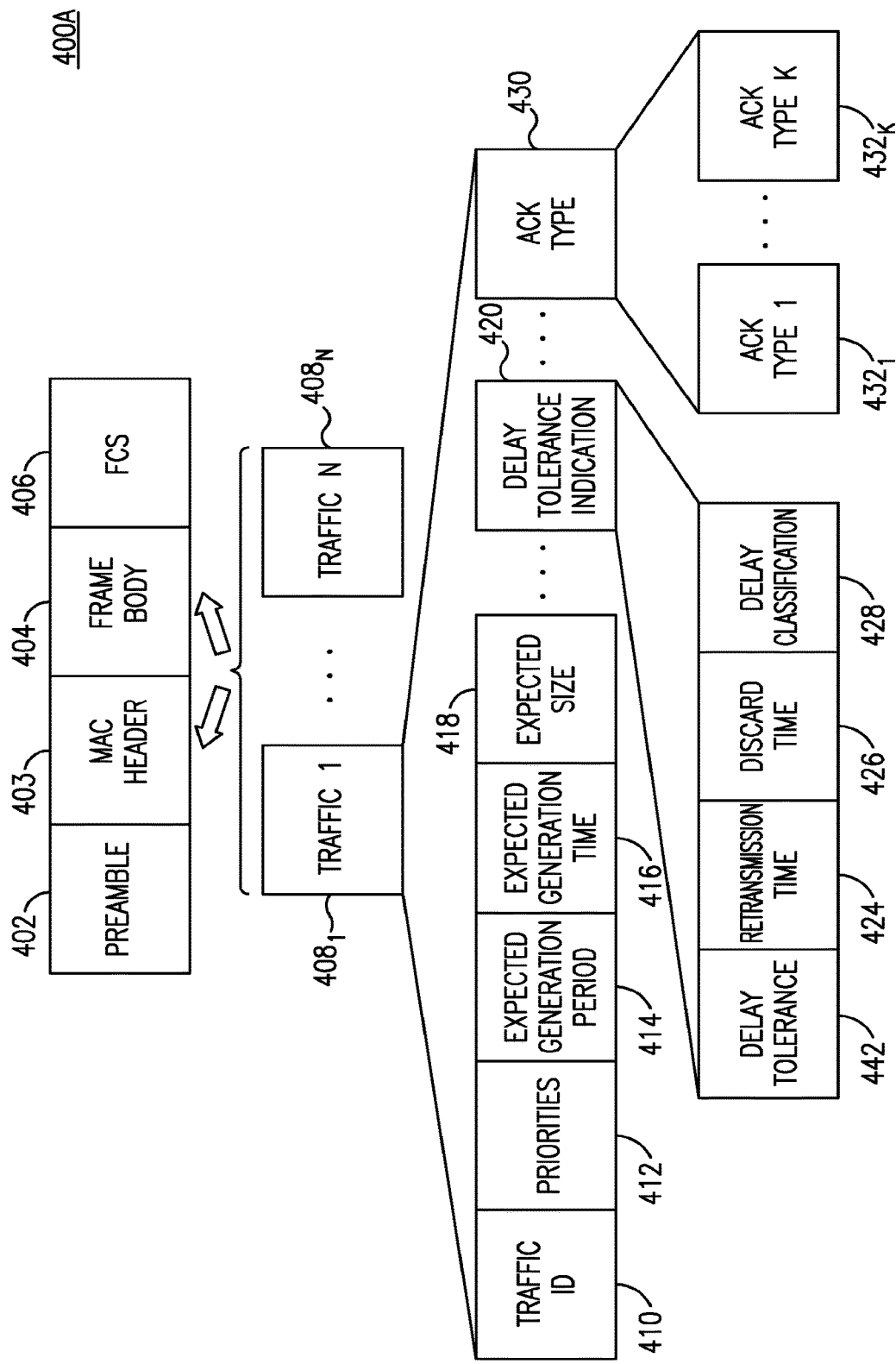
FIG. 4A shows a frame format of an example acknowledgment (ACK) setup request frame.

FIG. 4A shows a frame format of an example ACK setup request frame 400A, which may be used for setting up ACKs for multi-WTRU ACK/BA mechanisms. The example ACK setup request frame 400A may include, but is not limited to include, any of the following fields and/or subfields, which may be nested within other fields, repeated within the frame 400A (e.g., based on WTRUs or traffic), and or may appear in any order within ACK setup request frame 400A: a preamble 402; a MAC header 403; a frame body 404; a frame check sequence (FCS) field 406; traffic fields $408_1 \ldots 408_N$; traffic identification field 410; priorities information field 412; expected generation period/frequency field 414; expected generation time field 416; expected size field 418; detailed delay tolerance indication field 420; delay tolerance field 422; retransmission time field 424; discard time field 426; delay tolerance classification (DTC) field 428; and/or ACK type fields $432_1 \ldots 432_K$. The ACK setup request frame 400A may include other fields not shown. The fields in ACK setup request frame 400A are described in further detail below.

The preamble field 402 may include training signals and/or information for the recipient (i.e., receiving) WTRUs on how to decode the ACK setup request frame 400A and/or information on acknowledgement setup. The frame body field 404 may carry information for the recipient WTRUs on ACK setup. The preamble field 402 and/or the frame body 404, or any part of the frame 400A, may contain one or more of a traffic fields $408_1 \ldots 408_N$. Each of the traffic fields $408_1 \ldots 408_N$ may include, but is not limited to include, any of the following information: information about one or more corresponding traffic streams that may be identified by traffic identifiers (TIDs); information about one or more packets; and/or information on one or more access categories (ACs) for the originating WTRU that is setting up or making the arrangement for ACK mechanisms.

For example, each traffic field $408_1 \ldots 408_N$ may contain, but is not limited to contain, one or more of the following fields: a traffic identification field 410; a priorities field 412; an expected generation period/frequency field 414; an expected generation time field 416; expected an expected size field 418; a detailed delay indication field 420; and an ACK type field 430. The traffic identification (ID) field 410 may include traffic identification information including, but not limited to, the following information: TIDs for traffic streams; access categories for traffic; priorities; packet/aggregated packet sequence numbers; packet batch numbers (i.e., the number of a batch or a set of packets); and/or some identity defined by the originating (transmitting) WTRU.

The priorities field 412 may indicate the priorities of the traffic and/or the originating WTRU, such as the User Priority (UP), for example. The expected generation period/frequency field 414 may indicate the generation period and/or frequency of the traffic and/or WTRU indicated. The expected generation time field 416 may indicate the generation time of the traffic and/or WTRU, for example by indicating an offset from a time reference (e.g., using a timing synchronization function (TSF) timer), or by indicating an absolute time or any other time reference.

The expected size field 418 may indicate the expected size of data generated for the indicated traffic or originating WTRU. The detailed delay indication field 420 may indicate the detailed delay tolerance, and may include, but is not limited to include, the following subfields: a delay tolerance field 422; a retransmission time field 424; a discard time field 426; and/or a delay tolerance classification field 428. The delay tolerance field 422 may indicate the delay tolerance that the packets of the indicated traffic may sustain. For example, the delay tolerance field 422 may be specified in nanoseconds (ns), microseconds (μs), milliseconds (ms), time units (TUs), or any other time units. In an example, the delay tolerance field 422 may be specified from: the time of the generation of the packet; the transmission of an UL request frame; a certain point of time; and/or certain values of the TSF timer.

The retransmission time field 424 may indicate the time at which the transmitting (originating) WTRU considers that a transmitted packet (e.g., a single packet or an aggregated packet) is not correctly received and will start to retransmission procedure for that packet (or aggregated packet). The retransmission time field 424 may be indicated as an absolute time, or a period starting from a certain point of time, such as the time of generation of the packet, the transmission time of the packet, or the end of the transmission of the packet, for example. In an example, after the retransmission time indicated by the retransmission time field 424 has passed, the receiving (recipient) WTRU may decide not to transmit an ACK frame, such as an ACK/BA or multi-WTRU ACK/BA, even if such an ACK frame has not been transmitted before for the indicated packet.

The discard time field 426 may indicate the time at which point the transmitting WTRU may consider the packet (e.g., a single packet or an aggregated packet) as obsolete and may not attempt to transmit or retransmit the packet. The discard time field 426 may be indicated as an absolute time, or as a period of time starting from a certain point of time, such as the time of generation of the packet, transmission time of the packet, or the end of the transmission of the packet, for example. After the discard time indicated by the discard time field 426, a WTRU, for example an AP, may decide not to schedule or allocate resources for the transmission of the indicated packet.

The delay tolerance classification field 428 may be abstracted to delay tolerance levels. For example, delay tolerance levels may include: level 0, which may be associated with a delay tolerance of 0 ns-50 ns, and level 1, which may be associated with a delay tolerance of 51 ns-100 ns, among other levels similarly defined. A tolerance interval may be calculated using the delay tolerance classification level (or delay tolerance classification number or value). The delay tolerance classification levels and the associated delay tolerance intervals may be indicated, for example, in the delay tolerance classification field 428. In an example, each of the delay tolerance classification levels may be associated with pre-defined or preset values of corresponding delay tolerance intervals, retransmission times, discard times, and/or desired ACK types.

An ACK type field 430 may be used to indicate the acknowledgement type that is applicable to the indicated traffic or originating WTRU. For example, ACK types may include, but are not limited to include: SU ACK; immediate SU BA; SU delayed BA; SU HT-delayed BA; immediate multi-WTRU ACK/BA; delayed multi-WTRU ACK/BA; immediate MU ACK; immediate MU BA; delayed MU BA; and/or delayed MU HT-delayed BA. Each ACK type may be associated with a delay tolerance classification (DTC). For example, delay tolerance classification level 0 (DTC0) may be associated with an immediate SU ACK/BA, delay tolerance classification level 1 (DTC1) may be associated with SU delayed BA, and delay tolerance classification level 2 (DTC2) may be associated with delayed multi-WTRU ACK/BA. In an example, when a packet is generated, the UL request message for this packet may indicate the DTC level as DTC2 (i.e., tolerance for a longer delay). Thus, when resources are allocated quickly for a packet with delay tolerance classification DTC2, it may be assumed that the packet may be acknowledged by a delayed multi-WTRU ACK/BA. If resource has been allocated for the packet at a much later time, such that the packet's delay tolerance classification has become DTC0 (i.e., needing a shorter delay/less tolerance for a long delay), then the packet may need to be acknowledged directly using an immediate SU ACK/BA. More than one type of ACK (e.g., ACK type fields $432_1 \ldots 432_K$) may be used for the indicated traffic, and each ACK type may be associated with a delay tolerance classification.

A recipient WTRU receiving an ACK setup request frame, such as ACK setup request frame 400A, may respond with an ACK setup response frame immediately or with delay. An example design of the ACK setup response frame may include a preamble and/or frame body. The preamble may include training signals and information for the receiving WTRUs on how to decode the frame and/or on acknowledgement setup. The frame body may carry information for the receiving WTRUs on acknowledgement setup. The preamble and/or the frame body or any part of the frame may include, but is not limited to included, any one or more of the following fields: a status field; alternative values for detailed delay indication field, which may include retransmission time, discard time, and/or delay tolerance classification fields; and/or an alternative values for ACK type field. The fields in an example ACK setup response frame are described below.

A status field of an ACK setup response frame may indicate the status of the ACK setup procedure including, but not limited to, the following statuses: success; failed; failed without reason; and/or failed with alternative values.

An alternative values for detailed delay indication filed of an ACK setup response frame may indicate the detailed delay tolerance and may include a retransmission time field and/or a delay tolerance classification field. A retransmission time field may indicate the time at which the transmitting WTRU may consider a transmitted packet (e.g., a single packet or an aggregated packet) as not being correctly received and may start the retransmission procedure for that packet. The retransmission time may be indicated as an absolute time, or a period starting from a certain point of time, such as the time of generation of the packet, the transmission time of the packet, or the end of the transmission of the packet, for example. After the retransmission time, the receiving WTRU may decide not to transmit an acknowledgement frame, such as an ACK/BA, multi-WTRU ACK/BA even such an acknowledgement for the packet has not been transmitted before.

A discard time field may be used to indicate the time at which point the receiving WTRU may decide not to schedule or allocate resources for the transmission/retransmission of the packet. For example, this discard time may be specified from the expected generation time, or from the first transmission of the packet, or from the transmission of the first UL request frame for that frame containing the packet. As described above, the delay tolerance classification may be abstracted to a few levels, such as level 0, which may be associated with a delay tolerance of 0 ns-50 ns, and level 1, which may be associated with a delay tolerance of 51 ns-100 ns, among other levels. The tolerance interval may be calculated using the delay tolerance classification number. The delay tolerance classification levels and the associated delay tolerance interval may be indicated. Each of the delay tolerance classification level may be associated with a set values corresponding to a delay tolerance interval, retransmission time and/or discard time, as well as desired ACK types.

An alternative values for ACK Type field may be used to indicate the acknowledgement type that is applicable to the indicated traffic or WTRU. The ACK types may include, but are not limited to include, any of the following types: SU ACK; immediate SU BA; SU delayed BA; SU HT-delayed BA; immediate multi-WTRU ACK/BA; delayed multi-WTRU ACK/BA; immediate MU ACK; immediate MU BA; delayed MU BA; and/or delayed MU HT-delayed BA.

Each ACK type may be associated with a delay tolerance classification (DTC). For example, delay tolerance classification level 0 (DTC0) may be associated with an immediate SU ACK/BA, delay tolerance classification level 1 (DTC1) may be associated with SU delayed BA, and delay tolerance classification level 2 (DTC2) may be associated with delayed multi-WTRU ACK/BA. In an example, when a packet is just generated, the UL request for this packet may indicate DTC2. When resource is allocated quickly for the packet with DTC2, then the packet may be acknowledged by a delayed multi-WTRU ACK/BA. If resource has been allocated for the packet at a much later time when the packet has become DTC0, then the packet may be acknowledged directly using an immediate SU ACK/BA.

Figure 4B:
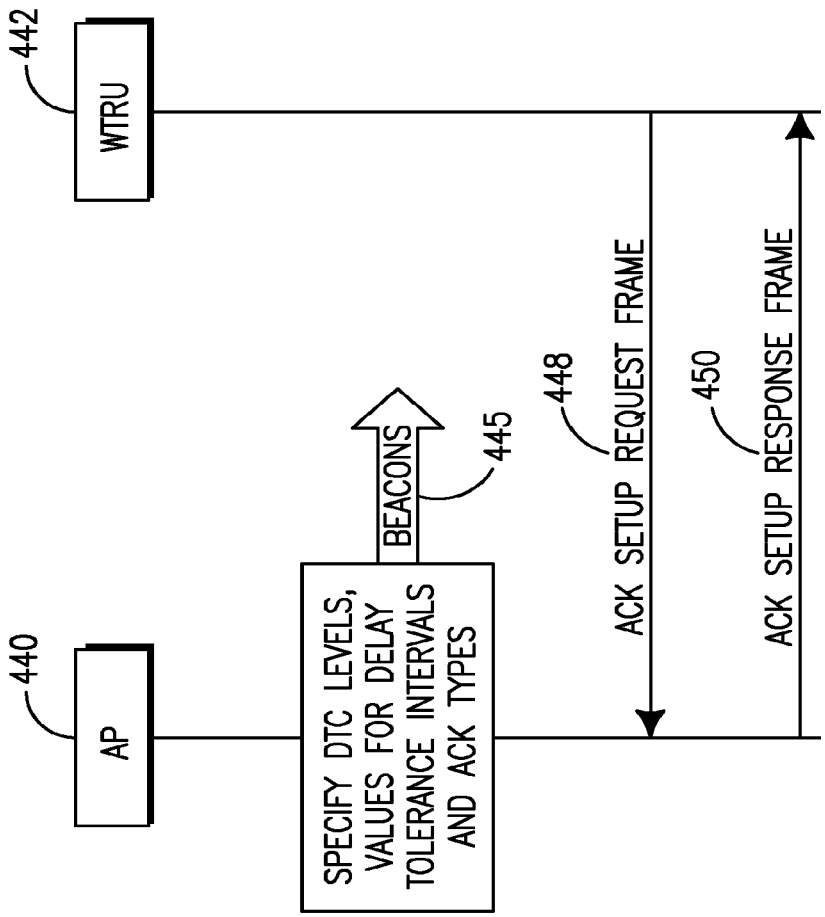
FIG. 4B shows a flow diagram of an example ACK request setup procedure.

FIG. 4B shows a flow diagram of an example ACK request setup procedure 400B in a WLAN system. The example WLAN system may include an AP 440, a WTRU 442 and other devices not shown. AP 440 could equivalently be a non-AP WTRU (i.e., a non-AP STA), and similarly WTRU 442 may be an AP or a non-AP WTRU. In an example, the AP 440 and WTRU 442 may be part of the same BSS, and/or the WTRU 442 and may be associated with the AP 440. At 446, the AP 440 may specify each of the delay tolerance classification levels, their associated values for delay tolerance intervals, and/or their associated acknowledgement types. For example, the AP 440 may provide this information to WTRU 442 (and other devices not shown) using beacons 445, or similarly short beacons, probe responses, other type of control frame, management frame, data, frame extension, and/or other type of frame.

The WTRU 442 may send an ACK setup request frame 448 to the AP 440. AP 440, after receiving the ACK setup request frame 448, may respond to the WTRU 442 immediately or with delay, with an ACK setup response frame 450. In an example, the AP 440, via the ACK setup response frame 450, may accept or reject the proposed detailed delay tolerance indications and/or associated ACK types (which may be associated with the delay tolerance classification levels), or reject the values by responding with alternative values.

If the requesting WTRU 442 finds the alternative values for the delay tolerance indications and/or associated ACK types proposed by the AP 440 acceptable, the WTRU 442 may further acknowledge the alternative values, for example by sending another ACK setup request frame (not shown)

with the proposed values, to which the AP 440 may send another ACK Setup Response frame (not shown) with status field set to "Success". If the requesting WTRU 442 finds the alternative values unacceptable, the WTRU 442 may resend an ACK Request frame (not shown) with new values for detailed delay tolerance indications and/or the ACK types (which may be associated with different delay tolerance classification levels).

In another example, the detailed delay tolerance indication and/or ACK types (which may be associated with different delay tolerance classification levels) may be included in the setup process for BA, delayed BA, HT-delayed BA Extension, and/or multi-WTRU ACK/BA, for example. In another example, any part of the ACK setup request and response frame or any combinations thereof may be implemented as any of the following frames: a control frame or a management frame such as action frames; action no ACK frames; other types of management frames; control frames; extension frames; null data packet (NDP) frames; and/or NDP carrying MAC information frames. Moreover, the detailed delay tolerance indication and/or ACK types may additionally or alternatively be implemented as an information element, sub-element, set or subset of fields, or subfields, of a management frame, control frame, extension frame, NDP frame or data frame or as a part of a MAC/PLCP header.

Figure 5:
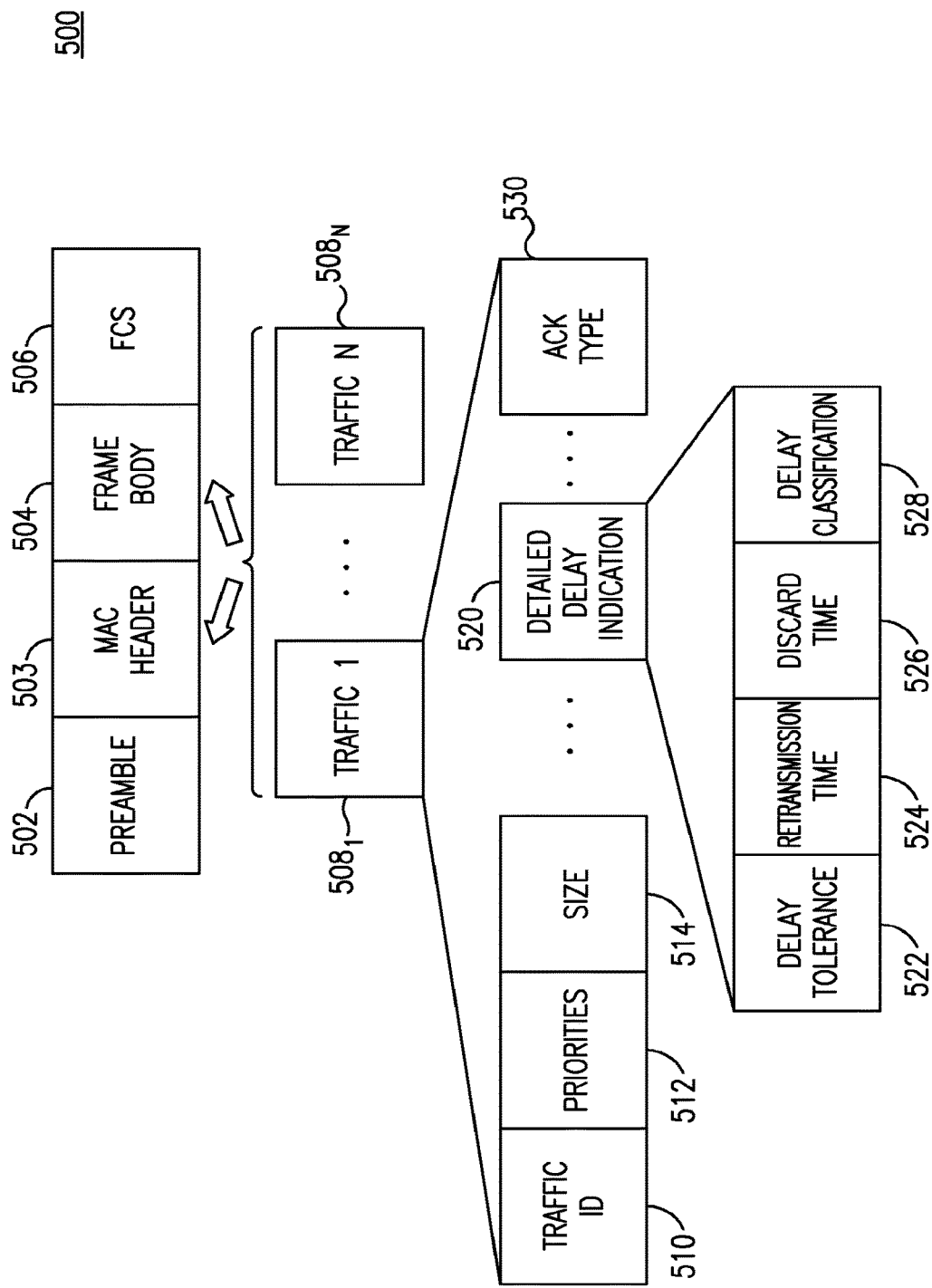
FIG. 5 shows a frame format of an example UL request frame with delay tolerance indication and ACK type.

In another example, a WTRU may indicate delay tolerance and preferred acknowledgement options to an AP in an UL request. FIG. 5 shows a frame format of an example UL request frame 500 with a delay tolerance indication and ACK type. The UL request frame 500 may include a preamble 502, a MAC header 503, a frame body 504, and an FCS field 506. A preamble 502 may include training signals and/or information for the receiving (recipient) WTRUs on how to decode the UL request frame 500 and/or on acknowledgement setup. A frame body 504 may carry information for the receiving WTRUs on acknowledgement setup.

The preamble 502 and/or the frame body 504, or any part of the UL request frame 500, may contain one or more of a traffic field 1–N. may contain one or more of a traffic fields $508_1 \ldots 508_N$. Each of the traffic fields $508_1 \ldots 508_N$ may include, but is not limited to include, any of the following information: information about one or more corresponding traffic streams; information about one or more packets; and/or information on one or more access categories (ACs) for which the originating WTRU is requesting resource to transmit.

For example, each traffic field $508_1 \ldots 508_N$ may contain, but is not limited to contain, one or more of the following fields: a traffic identification field 510; a priorities field 512; an expected size field 514; a detailed delay indication field 520; and an ACK type field 530. The traffic identification (ID) field 510 may include traffic identification information including, but not limited to, the following information: TIDs for traffic streams; access categories for traffic; priorities; packet/aggregated packet sequence numbers; packet batch numbers (i.e., the number of a batch or a set of packets); and/or some identity defined by the originating (transmitting) WTRU.

The priorities field 512 may indicate the priorities of the traffic and/or the originating WTRU, such as the User Priority (UP), for example. The size field 514 may indicate the size of data buffered for the indicated traffic or WTRU. The detailed delay indication field 520 may indicate the detailed delay tolerance for the indicated traffic, and may include, but is not limited to include, the following subfields: a delay tolerance field 522; a retransmission time field 524; a discard time field 526; and/or a delay tolerance classification field 528. The delay tolerance field 522 may indicate the delay tolerance that the packets of the indicated traffic may sustain. For example, the delay tolerance field 522 may be specified in nanoseconds (ns), microseconds (μs), milliseconds (ms), time units (TUs), or any other time units. In an example, the delay tolerance field 522 may be specified from: the time of the generation of the packet; the transmission of the UL request frame 500; a certain point of time; and/or certain values of the TSF timer.

The retransmission time field 524 may indicate the time at which the transmitting (originating) WTRU considers that a transmitted packet (e.g., a single packet or an aggregated packet) is not correctly received and will start to retransmission procedure for that packet (or aggregated packet). The retransmission time field 524 may be indicated as an absolute time, or a period starting from a certain point of time, such as the time of generation of the packet, the transmission time of the packet, or the end of the transmission of the packet, for example. In an example, after the retransmission time indicated by the retransmission time field 524 has passed, the receiving (recipient) WTRU may decide not to transmit an ACK frame, such as an ACK/BA, multi-WTRU ACK/BA, even if such an ACK frame has not been transmitted before for the indicated packet.

The discard time field 526 may indicate the time at which point the transmitting WTRU may consider the packet (e.g., a single packet or an aggregated packet) as obsolete and may not attempt to transmit or retransmit the packet. The discard time field 526 may be indicated as an absolute time, or as a period of time starting from a certain point of time, such as the time of generation of the packet, transmission time of the packet, or the end of the transmission of the packet, for example. After the discard time indicated by the discard time field 526, a WTRU, for example an AP, may decide not to schedule or allocate resources for the transmission of the indicated packet.

The delay tolerance classification field 528 may be abstracted to delay tolerance levels. For example, delay tolerance levels may include: level 0, which may be associated with a delay tolerance of 0 ns-50 ns, and level 1, which may be associated with a delay tolerance of 51 ns-100 ns, among other levels similarly defined. A tolerance interval may be calculated using the delay tolerance classification level (or number or value). The delay tolerance classification levels and the associated delay tolerance interval may be indicated, for example in the delay tolerance classification field 528. If such a delay tolerance classifications has already been setup or are pre-determined, then the delay tolerance classification field 528 may simply include the DTC level values. In an example, each of the delay tolerance classification levels may be associated with set values of delay tolerance interval, retransmission time and/or discard time, as well as desired ACK types.

An ACK type field 530 may be used to indicate the acknowledgement type that is being requested for the indicated traffic. For example, ACK types may include, but are not limited to include: SU ACK; immediate SU BA; SU delayed BA; SU HT-delayed BA; immediate multi-WTRU ACK/BA; delayed multi-WTRU ACK/BA; immediate MU ACK; immediate MU BA; delayed MU BA; and/or delayed MU HT-delayed BA. An ACK type in an ACK type field 530 may be associated with a DTC. For example, delay tolerance classification level 0 (DTC0) may be associated with an immediate SU ACK/BA, delay tolerance classification level 1 (DTC1) may be associated with SU delayed BA, and delay tolerance classification level 2 (DTC2) may be associated with delayed multi-WTRU ACK/BA. When a packet is first generated, the UL request frame 500 for this packet may indicate DTC2 (i.e., tolerance for a longer delay). If resources are allocated quickly for the packet, then the packet may have DTC2 (i.e., tolerance for a longer delay), such that the packet may be acknowledged by a delayed multi-WTRU ACK/BA. If, resource has been allocated for the packet at a much later time when the packet classification has become DTC0 (i.e., needing a shorter delay/less tolerance for a long delay), then the packet may need to be acknowledged directly using an immediate SU ACK/BA.

In an example, any part of the UL request frame 500 or any combinations thereof may be implemented as any of the following frames: a control frame or a management frame such as action frames; action no ACK frames; other types of management frames; control frames; extension frames; null data packet (NDP) frames; and/or NDP carrying MAC information frames. Moreover, the detailed delay tolerance indication and/or ACK types may additionally or alternatively be implemented as an information element, sub-element, set or subset of fields, or subfields, of a management frame, control frame, extension frame, NDP frame or data frame or as a part of a MAC/PLCP header. The detailed delay tolerance indication and/or ACK types may also be implemented as an information element, sub-element, or set or subset of fields or subfields of a management, control, extension, NDP or data frames or as a part of a MAC/PLCP header.

In another example, mechanisms may be used to announce acknowledgement schemes. A WTRU, for example an AP, may use a frame, such as a beacon frame or a trigger frame, to announce ACK schemes and the planned acknowledge time for the acknowledgment schemes so that the WTRUs that are expected to transmit know when to expect an acknowledgement. According to an example, the announcement of ACK schemes may use transmission opportunity (TXOP) type and/or expected ACK time indication procedures in beacon and/or trigger frames, as described herein.

In an example, a beacon/short beacon frame may announce a schedule for one or more of the subsequent beacon (sub)-intervals, which may be based on any of the following example information: a trigger frame at the beginning of the beacon (sub)interval; one or more intervals for one or more of WTRUs to transmit and receive; and/or one or more expected ACK time to transmit the ACK to the WTRUs. The expected ACK time may function similarly to the target beacon transmission time (TBTT) of the beacons, which may be delayed due to the occupied wireless medium/channel. However, each expected ACK, such as multi-WTRU ACK, multi-WTRU ACK/BA, or delayed BA, may be transmitted at the targeted time without taking into account any previous delays in transmitting acknowledgement frames.

In an example, a trigger frame may be transmitted at the beginning of a beacon (sub)interval, a TXOP, a target wake time (TWT), or a restricted access window (RAW). The trigger frame may include, but is not limited to include, any one or more of the following information: a TXOP type field; a group of WTRUs field; ACK types field; and/or expected ACK times fields. The information fields that may be included in the trigger frame are described in more detail below.

The TXOP type field may indicate the type of TXOP that follows the trigger frame. Examples of TXOP include, but are not limited to, the following types: SU; MU; SU MIMO; SU OFDMA; SU OFDMA/MIMO; MU OFDMA; MU MIMO; and/or MU OFDMA/MIMO. The group of WTRUs field may indicate one or more WTRUs, or a group of WTRUs, that are, have some common function, for example: allowed to transmit in the UL; expected to receive DL traffic; and/or expected to participate in MU transmissions. The relative order of the group of WTRUs or the order of the WTRUs indicated in the trigger frame may imply the slot in which the WTRUs may access the medium for DL and/or UL in the TXOP/Beacon (sub)interval following the trigger frame. In the case of MU transmissions, a fixed number of WTRUs, such as N WTRUs, may be expected to be grouped together for MU transmissions or receptions. For example, the first N WTRUs may be expected to be in the first MU group, and the second N WTRUs may be expected to be in the second MU group. The number N may be specified in the preamble or frame body or any part of the frame, for example. The slot for which the n.sup.th MU group (for 1 n N) is expected to access the medium (transmit and/or receive, UL and/or DL) may be implied by the order of the WTRUs included in the TXOP type field.

An ACK types field may indicate one or more ACK types that may be used by the AP in the TXOP/beacon (sub) interval following the trigger frame. Examples of ACK types include, but are not limited to, multi-WTRU ACK/BA; immediate SU ACK/BA; delayed SU BA; immediate multi-WTRU ACK/BA (e.g., M-BA); and/or delayed multi-WTRU ACK/BA (e.g., M-BA). The expected ACK Time(s) field may indicate one or more expected ACK times during the TXOP/Beacon (sub)intervals following the trigger frame (or similarly beacon frame). For example, an acknowledgement frame, such as delayed multi-WTRU ACK/BA or delayed SU BA, may be expected to arrive x ms (e.g., x ms may be 1.5 ms, 3 ms, or 4.5 ms) after a reference point of time, such as the end of the current transmitted frame, or the start of the beacon (sub)interval.

In an example, any part of the trigger frame or beacon frame described herein, or any combinations thereof, may be implemented as a control frame, or a management frame including, but not limited to: action frames; action no ACK frames; any other types of management frames; any other types of control frames; extension frames; NDP frames; and NDP carrying MAC information frames. Moreover, the ACK types may additionally or alternatively be implemented as an information element, sub-element, set or subset of fields, or subfields, of a management frame, control frame, extension frame, NDP frame or data frame or as a part of a MAC/PLCP header.

In another example, a trigger frame may be, but is not limited to, any of the following types of frames: an ACK, BA, multi-WTRU ACK/BA, any other type of acknowledgement frame, control frame, extension frame, management frame, data frame, and/or NDP frame. Such a trigger frame may include an indication or field that indicates that the current frame is serving as a trigger frame.

To further enable high efficiency ACK setup and ACK mechanisms, delay tolerance indication procedures in data or aggregated frames may be used. As part of delay tolerance indication procedures, a packet (e.g., a single (data) packet, a HE packet, and/or aggregated packets), such as A-MPDU or A-MSDU, may carry in its preamble and/or frame body or anywhere else any of the following information, described in further detail below: a detailed delay indication field; a delay tolerance field; a retransmission time field; a discard time field; and/or a delay tolerance classification field.

A detailed delay indication field may indicate the detailed delay tolerance for the indicated traffic, and may further include, but is not limited to include, any of the following subfields: a delay tolerance field; a retransmission time field; a discard time field; and/or delay tolerance classification. For example, a delay tolerance field may indicate the delay tolerance that the packets of the indicated traffic may sustain. The delay tolerance may be specified in ns, μs, ms, TU, or any other time units. The delay tolerance may be specified starting from the time of the generation of the packet, from the transmission of the frame, from a certain point of time, or using certain values of the TSF timer.

A retransmission time field may indicate the time at which the transmitting WTRU considers a transmitted packet (e.g., a single packet or an aggregated packet) is not correctly received and will start the retransmission procedure for that packet. The retransmission time field may be indicated as an absolute time, or a period starting from a certain point of time, such as the time of generation of the packet, the transmission time of the packet, or the end of the transmission of the packet. After the retransmission time, the receiving WTRU may decide not to transmit an ACK frame (such as an ACK/BA or multi-WTRU ACK/BA) even if such an ACK for the packet has not been transmitted before.

A discard time field may indicate the time at which the transmitting WTRU considers the packet as obsolete and will not attempt to transmit or retransmit the packet. The discard time may be indicated as an absolute time, or a period from a given point of time, such as the time of generation of the packet, the transmission time of the packet, or the end of the transmission of the packet, for example. After the discard time, a WTRU (e.g., an AP) may decide not to schedule or allocate resources for the retransmission of the packet.

The delay tolerance classification field may be abstracted to delay tolerance levels. For example, delay tolerance levels may include: level 0, which may be associated with a delay tolerance of 0 ns-50 ns, and level 1, which may be associated with a delay tolerance of 51 ns-100 ns, among other levels similarly defined. The tolerance interval may be calculated using the delay tolerance classification number. The delay tolerance classification levels and the associated delay tolerance interval may be indicated. If such a delay tolerance classifications has been setup or pre-determined, then this field may include simply the DTC level values. In an example, each of the delay tolerance classification levels may be associated with a set values of delay tolerance interval, retransmission time and/or discard time, as well as desired ACK types.

An ACK type field may be used to indicate the acknowledgement type that is being requested for the indicated traffic. For example, ACK Types may include, but are not limited to include: SU ACK; immediate SU BA; SU delayed BA; SU HT-delayed BA; immediate multi-WTRU ACK/BA; delayed multi-WTRU ACK/BA; immediate MU ACK; immediate MU BA; delayed MU BA; and/or delayed MU HT-delayed BA. The ACK type may be associated with a DTC. For example, delay tolerance classification level 0 (DTC0) may be associated with an immediate SU ACK/BA, delay tolerance classification level 1 (DTC1) may be associated with SU delayed BA, and delay tolerance classification level 2 (DTC2) may be associated with delayed multi-WTRU ACK/BA. When a packet is just generated, the UL request for this packet may indicate DTC2 (i.e., tolerance for a longer delay). If resources are allocated quickly for the packet, then the packet may have DTC2 (i.e., tolerance for a longer delay), such that the packet may be acknowledged by a delayed multi-WTRU ACK/BA. If, resource has been allocated for the packet at a much later time when the packet classification has become DTC0 (i.e., needing a shorter delay/less tolerance for a long delay), then the packet may need to be acknowledged directly using an immediate SU ACK/BA.

Figure 6:
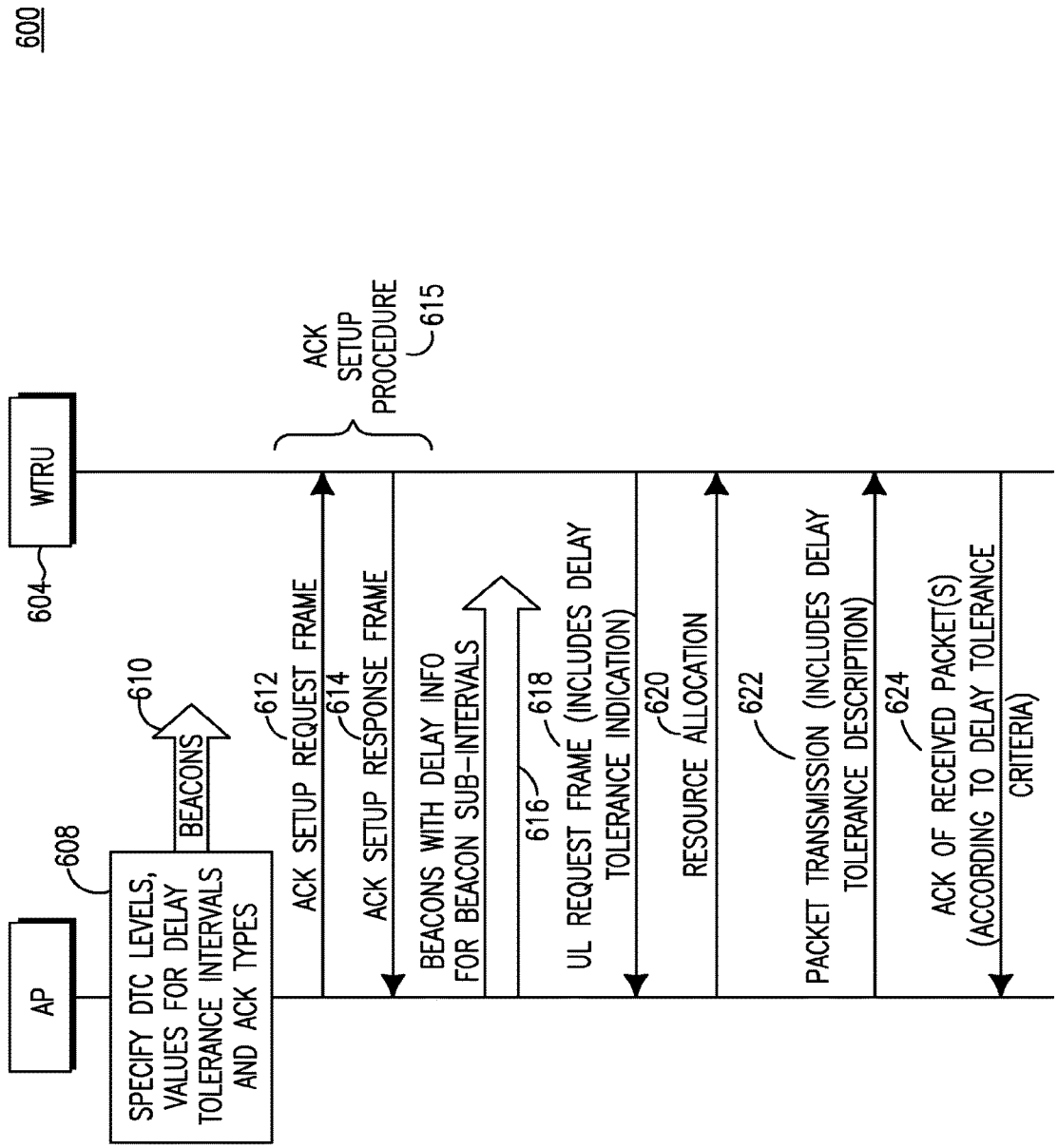
FIG. 6 shows a flow diagram of an example High efficiency ACK transmission procedure.

FIG. 6 shows a flow diagram of an example High efficiency ACK transmission procedure 600 in a WLAN system. The example WLAN system may include an AP 602 and a WTRU 604, and other devices not shown. AP 602 could equivalently be a non-AP WTRU (i.e., a non-AP STA), and similarly WTRU 604 may be an AP or a non-AP WTRU. In an example, the AP 602 and WTRU 604 may be part of the same BSS, and/or the WTRU 604 and may be associated with the AP 602. At 608, the AP 602 may specify each of the delay tolerance classification levels, their associated values for delay tolerance intervals, and/or their associated ACK types. For example, the AP 602 may provide this information to WTRU 604 (and other devices not shown) using beacons 610, or similarly short beacons, probe responses, other type of control frame, management frame, data frame, frame extension, and/or any other type of frame.

The WTRU 604 may conduct an ACK setup procedure 615 with AP 602 to establish a list of detailed delay tolerance descriptions, associated delay tolerance classification levels and/or associated acknowledgement types. ACK Setup procedure 615 may be accomplished by exchanging one or more rounds of ACK setup request frame(s) 612 and ACK setup response frame(s) 614. In an example, a WTRU class indication, such as sensors or meters (that may be plugged in, not shown), may imply certain delay profile, delay tolerance classifications/descriptions, and/or ACK types, to the WTRU 604.

AP 602 may announce detailed delay tolerance descriptions, delay tolerance classification levels, and/or ACK types for one or more of beacon (sub)intervals by transmitting beacons 616 (or similarly short beacons, other control, management, data, extension frames, NDP, or other types of frames). The AP 602 may also announce, via beacons 616, one or more expected ACK times for one or more beacon (sub)intervals.

The WTRU 604 may request a resource allocation for transmitting packets by sending an UL request frame 618 to AP 602. When transmitting the UL request frame 618, the WTRU 604 may evaluate the delay tolerance for its locally buffered traffic and provide delay tolerance indication for the indicated traffic in the UL request frame 618, for example, by providing detailed delay tolerance description, and/or delay tolerance classification levels, which may have been previously announced by the AP 602 (for example via beacons 610) or previously negotiated. The WTRU 604 may include the requested ACK types in the UL request frame 618.

The WTRU 604 may transmit its packets, intended for AP 602, either by obtaining the channel or when the WTRU 604 is allocated resources by the AP 602 via a resource allocation 620. When the WTRU 604 sends its packet(s) (e.g., a single packet, an aggregated packet, or a packet as a part of a MU transmissions) to AP 602 via packet transmission 622, the WTRU 604 may evaluate the delay tolerance for the packet(s) that it is transmitting, and indicate the delay tolerance with the packet in the packet transmission 622, for example by including the detailed delay tolerance description, and/or using the delay tolerance classification levels. The WTRU 604 may include the requested ACK types in the packet transmission 622, which may be associated with the indicated delay tolerance classification levels. The delay tolerance description, delay tolerance classification levels, and/or requested ACK types, may be included in the preamble, and/or frame body, and/or anywhere in the packet transmission frame 622.

The AP 602 (i.e., the receiving/recipient WTRU of packet transmission frame 622) may send an ACK frame 624 to WTRU 604 to acknowledge the received packet(s) from WTRU 604 in accordance with the indicated delay tolerance description, delay tolerance classification levels, and/or requested ACK types (i.e., that were indicated in the packet transmission 622). The transmission timing of the appropriate ACK type may depend on the delay tolerance description, and/or delay tolerance classification levels provided.

The transmitting WTRU 604 may wait until the indicated expected ACK time for the acknowledgement for the packets that it has transmitted. If the transmitted packet was not acknowledged by an acknowledgement, such as delayed BA or delayed multi-WTRU ACK/BA (e.g., M-BA), by the expected ACK time from the AP 602, then the transmitting WTRU 604 may initiate a retransmission procedure (not shown). For example, if the transmitting WTRU 604 has indicated, for example, in the transmitted packet in transmission 622 that it needs acknowledgement prior to the indicated expected acknowledgement time, the WTRU 604 may consider that the packet was not correctly received by the receiving AP 602 if the retransmission time for the packet has expired. In this case, the transmitting WTRU 604 may start the retransmission procedure. If the discard time has expired for a particular packet, then the transmitting WTRU 604 may not attempt to transmit or retransmit the packet, and the AP 602 may choose not to allocate any resources for the transmission and/or retransmission of the packet.

Multi-WTRU ACK/BA mechanisms, for example using the example multi-WTRU ACK/BA control frames shown in FIGS. 2 and 3, may provide higher efficiency in acknowledging transmissions from multiple WTRUs than sending individual ACK frames. However, efficient and appropriate ACK transmission procedures may be needed to address some of issues as minimizing delay for all WTRUs, and providing correct fault recovering procedure when the transmitted data or ACK/BA was not correctly received. In an example, procedures may be defined for high efficiency acknowledgment transmission with feedback, buffer and operation mode change indication, as described below.

In an example, acknowledgement frames, such as ACK BA, multi-WTRU ACK/BA (e.g., M-BA), or MU block ACK request (BAR), may carry additional information, such as a buffer indication field, feedback field, and/or operation mode change field, as described below. The inclusion of these fields and information within ACK frames may enable the WTRU to provide efficient and fast communication to one or more WTRUs, such as the destination WTRU of an ACK frame, to achieve high efficiency.

In an example, a valid data packet or any other type of packet transmitted by a WTRU may be considered as a valid ACK frame to the previously transmitted packets to the same WTRU. The data packet(s) or any other type of frames that may include an acknowledgement field may be considered a valid acknowledgement frame to the previously transmitted packets to the same WTRU. In another example, an aggregated frame, such as an A-MPDU or A-MSDU, transmitted by a WTRU, that includes an ACK, BA and/or multi-WTRU ACK/BA (e.g., M-BA), may be considered as a valid acknowledgement frame to the previously transmitted packets to the same WTRU.

In another example, a buffer indication field may include buffer status for each access category, each traffic stream which may be identified by TID, and/or the total buffered traffic at the WTRU. The buffer status may include, but is not limited to include, any of the following information: a number of packets; a total time estimated to transmit the packets; and/or total bytes for each packet or packets, which may be for each access class (AC), or TID, or for the entire WTRU. The delay requirements may be specified in an ACK frame for each packet, or each AC, or each TID, so that the destination WTRU of the ACK frame may be able to allocate resources for the buffered traffic.

In another example, the feedback field in an ACK frame may include, but is not limited to include, any of the following feedback information: feedback for resource blocks (RBs), channel(s), and/or subcarriers; detailed or compressed channel state information (CSI) feedback; detailed or compressed channel quality indication (CQI); detailed or compressed beamforming feedback; modulation and coding scheme (MCS) feedback; and/or preference indication such as preferred channel indication, preferred RB indication, preferred MCS indication. The feedback field in an ACK frame may provide information to one or more WTRUs, such as the destination WTRU of the ACK frame. In an example, the feedback field may contain relative (delta) quantity or MCS performance values. For example, the feedback field may include the current RB(s), a preferred or alternative RB(s), and a value indicating the difference in CQI between the current and alternative RBs. In this case, the quality or CQI could be better or worse for the alternative RB(s) relative to the current RB(s). The destination WTRU of the acknowledgement frame may then adapt resource allocation, MCS setting, beamforming setting, SU or MU-MIMO settings in subsequent transmissions based on any of the information in the feedback field.

In an example, an operation mode change field in an ACK frame may include the transmission mode and reception mode scheduled for the transmitting WTRU(s) of the acknowledgement frame. For transmission and reception modes, operation mode change may include a change in one or more of the following parameters: MU capability; SU/MU OFDMA capability; SU/MU MIMO capability; SU number of spatial streams (Nss); MU Nss; Nss; operation bandwidth; operation channel; operation resource block width; reception monitoring RB/channel; and/or power-off period. The operation mode change field may include a time or delay after which the indicated operation mode change takes effect.

The buffer indication field, the feedback field, and/or the operation mode change field, and any subset thereof, may be implemented as any other field, subfield, information element, MAC and/or PHY headers, and may be included in any kind of frames such as control frames, management frames, data frames, extension frames, NDP frames, and/or aggregated packets, such as A-MPDUs or A-MSDUs. The buffer indication field, the feedback field, and/or the operation mode change field, and any subset thereof, may be implemented in a field such as the QoS field, the HTNHT control field, or an HE control field in the MAC header or PHY headers.

According to an example high efficiency acknowledgement procedure, a transmitting (originating) WTRU (e.g., an AP) may transmit DL (SU or MU) packets to one or more WTRUs, for example as part of control frames, a management frames, a data frames, extension frames, aggregated packets, and/or NDP frames. In the DL packets, the transmitting WTRU may provide resource allocation for the receiving (recipient) WTRUs to transmit UL packets, such as acknowledgement packets, or data packets. The transmitting WTRU may also provide information on broadcast/multicast channel/RBs on which the receiving WTRU should monitor subsequently for broadcast/multicast information. The receiving WTRU may transmit in a SU or a MU PPDU to the transmitting WTRU an acknowledgement frame, such as ACK, BA, multi-WTRU ACK/BA (e.g., M-BA), in order to acknowledgement the packets received.

In an example, a valid data packet or any other type of packet transmitted by a receiving (recipient) WTRU may be considered as a valid ACK frame to the previously transmitted packets to the receiving WTRU. The data packet(s) or any other type of frames with an acknowledgement field used for acknowledging previously received frames may be considered as a valid acknowledgement frame to the previously transmitted packets to the receiving WTRU. In an example, an aggregated frame, such as an A-MPDU or A-MSDU, which may include an ACK, BA, and/or multi-WTRU ACK/BA (e.g., M-BA), transmitted by a receiving WTRU may be considered as a valid ACK frame to the previously transmitted packets to the receiving WTRU.

In an example, the receiving WTRU (i.e., the WTRU that received packets from the transmitting WTRU) may provide in the ACK frames additional information, data packets or other type of packets serving as valid acknowledgement frames, to the transmitting WTRU along with feedback, buffer status and/or scheduled operation mode change using the feedback field, buffer status field, and/or operation mode change field.

The destination WTRU of the ACK frame (i.e., the transmitting or originating WTRU of the data packets), after receiving the acknowledgement frame that may include feedback, buffer status, and/or operation mode change, may then adjust resource allocation, scheduling of transmission or receptions, transmission and reception settings, and/or grouping of WTRUs, for example, based on the received feedback, operation mode change, and buffer status.

In an example, the destination WTRU of the ACK frame (e.g., an AP) may allocate resources according to the feedback in the ACK frame, such as CSI or CQI feedback, preferred RBs and/or one or more channel indications. The destination WTRU may allocate RBs and channels based on the feedback to improve performance between the destination WTRU, which is also the originating WTRU, and the receiving (recipient) WTRU that sent the ACK frame. In an example, the destination WTRU of the ACK frame (e.g., an AP) may allocate resources according to the feedback, such as MCS feedback or Preferred MCS indication. The destination WTRU may use another MCS that is more suitable for the channel condition based on the feedback information.

In another example, the destination WTRU (e.g., an AP) may allocate resources according to the Operation Mode Change information in the received ACK frame. For example, the destination WTRU may allocate more or less RBs and channels, and/or more or less Nss, based on the operation mode change. In another example, the destination WTRU may transmit broadcast/multicast packets to the receiving WTRU on the indicated Broadcast/Multicast/Monitor RBs and channels. In another example, the destination WTRU may not allocate any resources or transmit any packets to the receiving WTRU if the receiving WTRU has indicated that it will power off for a certain period of time. In another example, the destination WTRU (e.g., an AP) may allocate resources according to the Buffer Status in the received ACK frame. The destination WTRU may allocate more or less RBs/channels to the receiving WTRU according to its buffer status and the delay requirements of the buffered packets.

In an example, the destination WTRU (e.g., an AP) may adjust transmission/reception setting when communicating with the receiving WTRU according to the feedback, operation mode change, buffer status received in the ACK frame. The destination WTRU may switch between SU or MU transmission/reception mode based on any of the following example events: the receiving WTRU indicates in the ACK frame that the receiving WTRU switched to SU operation mode; the receiving WTRU added or decrease Nss used; and/or packets are transmitted to the receiving WTRU on the RBs/channels that the receiving WTRU is monitoring, which may be indicated by the destination WTRU or receiving WTRU. The destination WTRU of the ACK frame may also adjust a beamforming matrix. The destination WTRU may only adjust the transmission/reception settings after a time or delay if an operation mode change is indicated to take effect after a time or delay by the ACK frame (or a data/NDP frame acting as an ACK frame).

Further approaches to achieving high efficiency ACK transmission in WLAN systems include procedures for multi-WTRU ACK/BA transmissions, which allow a WTRU to acknowledge packets received from multiple WTRUs in a common frame or transmission. In an example approach, multi-WTRU ACK/BA transmissions may use power save multi poll (PSMP) procedures, as described below. PSMP procedures include PSMP sequences which begin with the transmission of a PSMP frame by a WTRU (e.g., an AP), and include one or more PSMP downlink transmission times (PSMP-DTTs) as a period for DL transmissions, and one or more PSMP uplink transmission times (PSMP-UTTs) as a period for UP transmissions.

In an example of multi-WTRU ACK/BA transmissions using PSMP procedures, an AP (e.g., or any WTRU) may transmit a multi-WTRU ACK/BA to the WTRUs during a PSMP-DTT. The transmitted multi-WTRU ACK/BA may serve as an acknowledgement for the frames that were transmitted to the AP, for example in PSMP-UTTs immediately previous to the current PSMP-DTT, or previous PSMP-UTTs, or in any beacon (sub)intervals that preceded the current PSMP-DTT during which the multi-WTRU ACK/BA frame is transmitted.

An AP may indicate to the WTRUs in a frame transmission (e.g., any control, management, data, extension or other type of frames, such as beacon, trigger frame, or PSMP frames) that the AP is expected to transmit a multi-WTRU ACK/BA in an indicated PSMP-DTT time. In this case, WTRUs that are expecting acknowledgement from the AP may sleep or doze (i.e., enter a power saving state), until the indicated PSMP-DTT time, for example, for the purpose of power saving.

Figure 7:
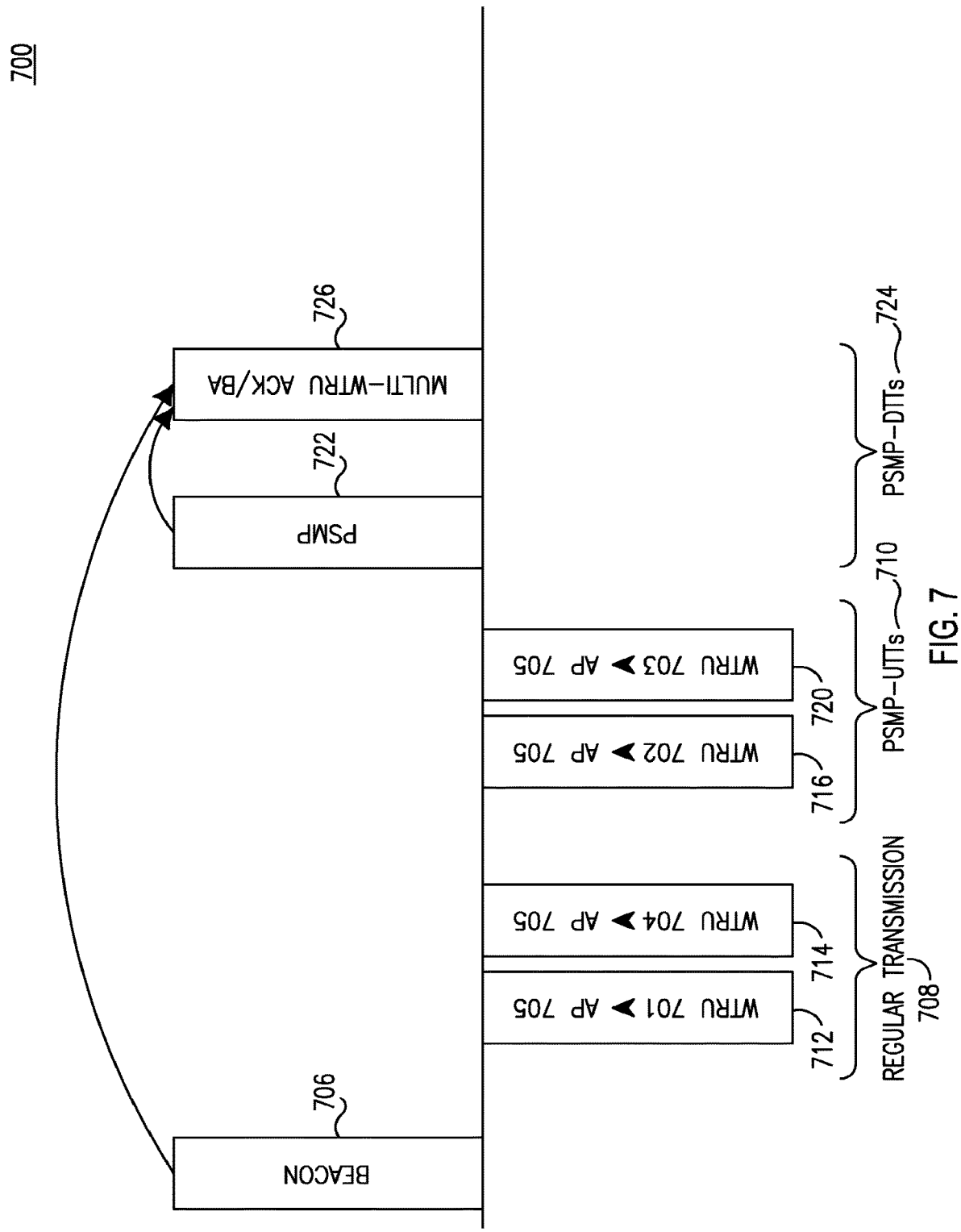
FIG. 7 shows a messaging diagram of an example multi-WTRU ACK/BA procedure using power save multi-poll (PSMP) procedures.

FIG. 7 shows a messaging diagram of an example multi-WTRU ACK/BA procedure 700 using the PSMP procedure. In the example multi-WTRU ACK/BA procedure 700, it is assumed that an AP 705 (the AP 705 may be any WTRU, including a non-AP WTRU) is communicating with WTRUs 701-704 in a WLAN system. The AP 705 may send a beacon 706 to WTRUs 701-704 that may include an indication (shown by arrow) that the AP 705 will transmit a multi-WTRU ACK/BA frame 726 in one or more PSMP-DTTs 724, which will occur one the PSMP-DTTs 724 are scheduled and have resources allocated to it. The beacon 706 may be a beacon or any control, management, public action, data, extension or other type of frames, including for example, a short beacon, a trigger frame, and/or a PSMP frame.

The scheduled time of the multi-WTRU ACK/BA frame 726 may be indicated in terms of a TSF timer, which may be offset from the transmitted frame (e.g., beacon 706) or an offset from a reference time, such as an offset from a targeted PSMP frame transmission time or end of the PSMP frame (e.g., PSMP frame 722). The multi-WTRU ACK/BA frame 726 may be acknowledgement of one or more frames that are received by the AP 705. For example, the multi-WTRU ACK/BA frame 726 may be acknowledgement of one or more frames that are received by the AP 705 during regular transmissions 708, previous PSMP UTTs 710, scheduled or unscheduled automatic power save delivery (APSD) (not shown), and/or scheduled medium access such as target wake time/restricted access window (TWT/RAW) (not shown). Examples of regular transmission 708 include frame 712 (e.g., data and/or control frame) transmitted from the WTRU 701 to AP 705, and frame 714 transmitted from WTRU 704 to AP 705. Examples of PSMP-UTTs transmissions include frame 716 transmitted from WTRU 702 to AP 705, and frame 720 transmitted from WTRU 7043 to AP 705.

Figure 8:
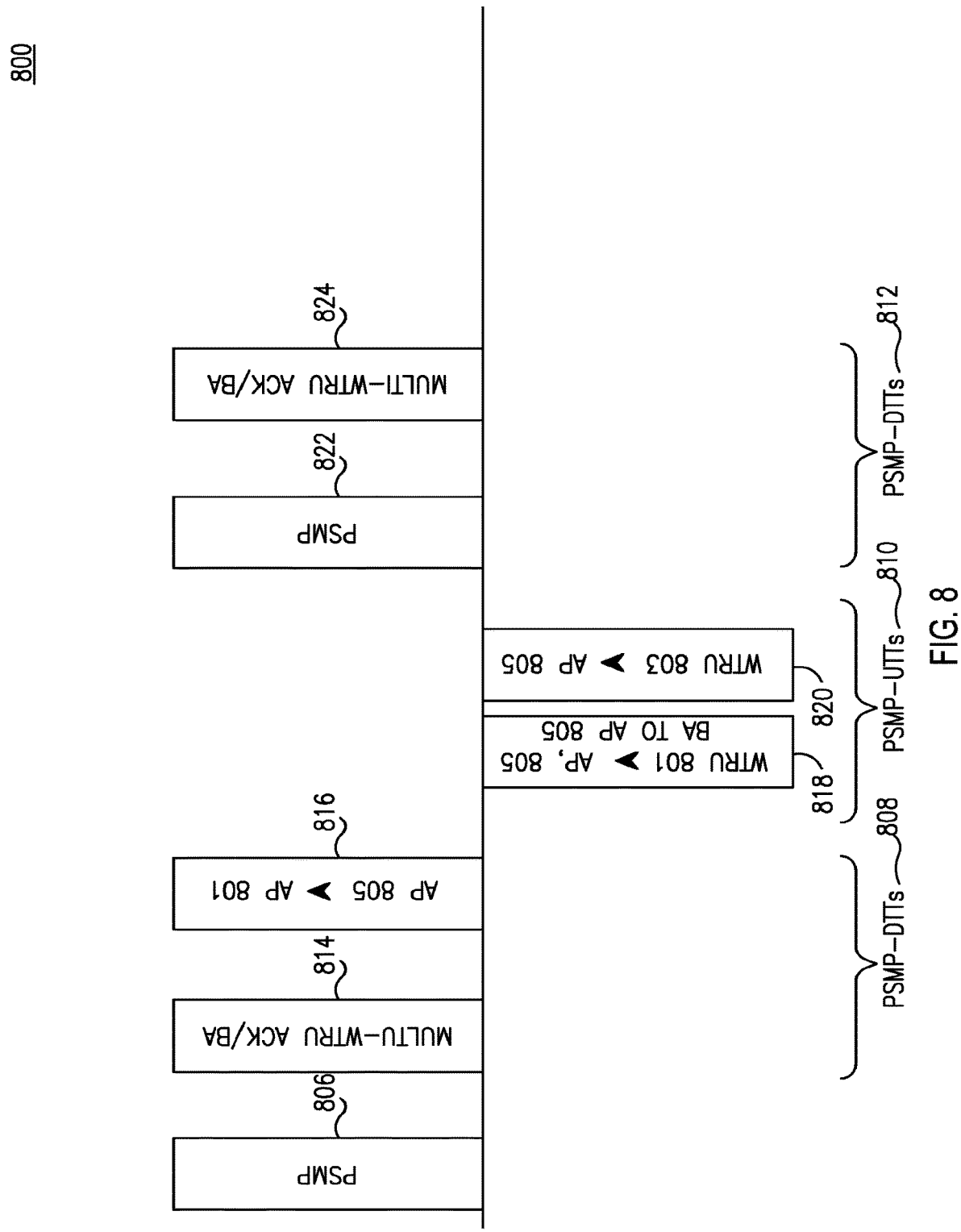
FIG. 8 shows a messaging diagram of an example multi-WTRU ACK/BA procedure using the PSMP bursts.

In another example, the transmission of multi-WTRU ACK/BA may be conducted using PSMP bursts. FIG. 8 shows a messaging diagram of an example multi-WTRU ACK/BA procedure 800 using the PSMP bursts. In the example multi-WTRU ACK/BA procedure 800, it is assumed that an AP 805 (the AP 805 may be any WTRU, including a non-AP WTRU) is communicating with WTRUs 801-804 in a WLAN system. AP 805 may notify the WTRUs 801-804 of a PSMP burst by indicating in a first PSMP frame 806 transmission that another PSMP frame 822 will follow after the current PSMP sequence. A PSMP sequence may include a PSMP-DTTs period, such as PSMP-DTTS 808, in which AP 805 may send downlink frames such as PSMP 806 (which may initiate the PSMP sequence), multi-WTRU ACK/BA frame 814, and frame 816 transmitted from the AP 805 to WTRU 801.

For each PSMP sequence, a multi-WTRU ACK/BA frame 814 and 824, respectively, may be used to acknowledge any one or more of the transmissions received previously by the AP 805. For example, the multi-WTRU ACK/BA frame 824 may be used to acknowledge the UL frame 818 (transmitted from WTRU 801 to AP 805, and including a BA to AP 805) and UL frame 820 (transmitted from WTRU 803 to AP 805) that were transmitted during PSMP-UTTs 810 in the PSMP sequence prior to PSMP frame 822.

In another example, the use of multi-WTRU ACK/BA in PSMP procedures may be indicated in any frame, such as beacon, short beacon, PSMP frames, NDP frames, and in MAC and/or PLCP headers. For example, the use of multi-WTRU ACK/BA in PSMP may be indicated by HTNHT/HE capability field. In another example, the use of multi-WTRU ACK/BA in PSMP may be indicated by setting the WTRU info type field to a value that may be reserved, or by using one or more reserved bits in the PSMP WTRU info fixed field. In another example, multi-WTRU ACK/BA may be transmitted as part of an aggregated packet, or a part of a MU PPDU.

In another example, multi-WTRU ACK/BA transmission procedures may use TWT/RAW power saving mechanisms. TWT is a function that may permit an AP to define a time or set of times for WTRUs to access the medium. The WTRU and the AP may exchange information, such as an expected activity duration, to allow the AP to control the amount of contention and overlap among competing WTRUs. The AP may use protection mechanisms to protect the channel or wireless medium during the expected duration of activity. TWT may be used to reduce network energy consumption by allowing WTRUs to enter in a doze state until their TWT arrives. RAW may allow partitioning of the WTRUs within a BSS into groups and restricting channel access to WTRUs within a designated group for a given time period. RAW may help to reduce contention and to avoid simultaneous transmissions from a large number of WTRUs hidden from each other.

Figure 9:
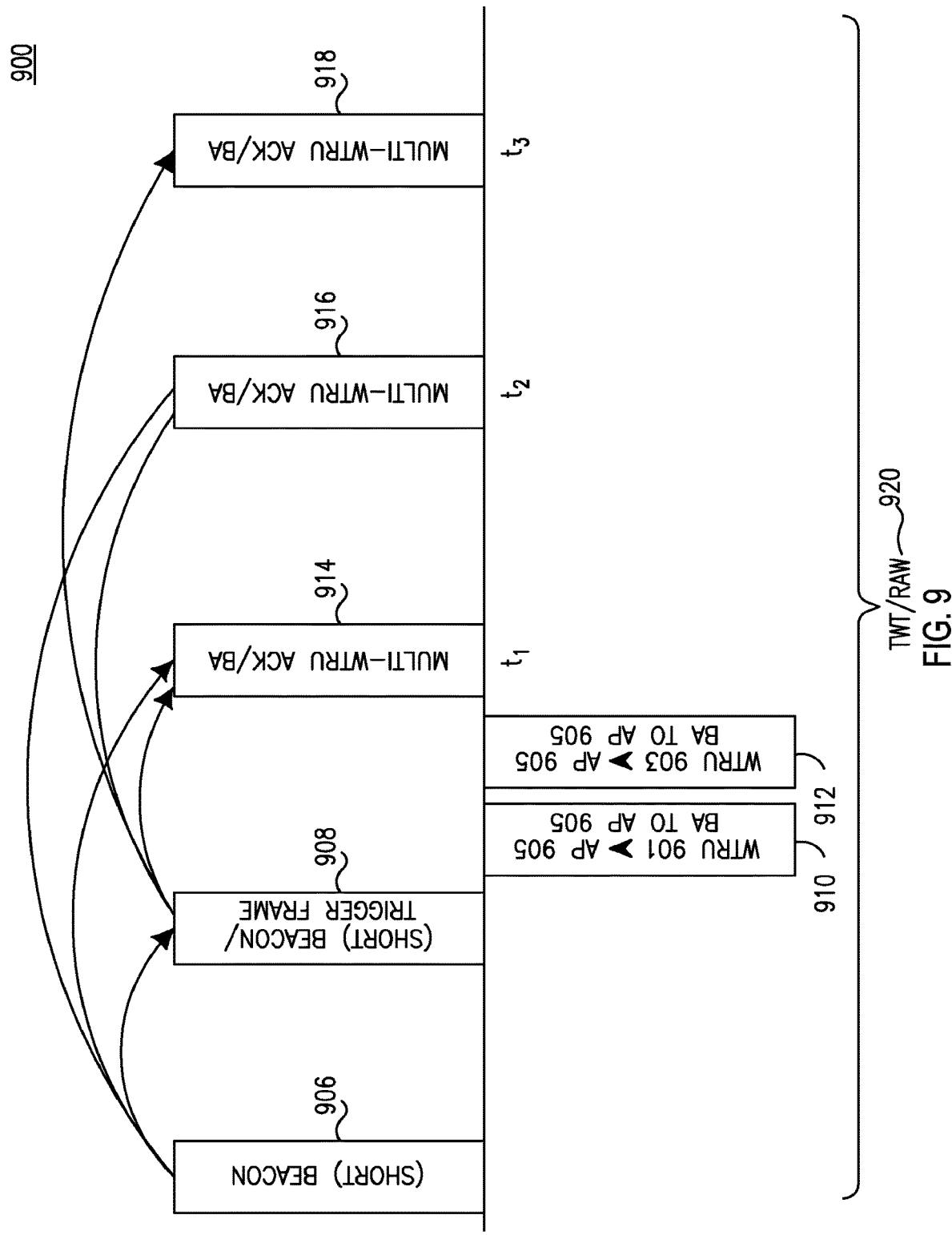
FIG. 9 shows a messaging diagram of an example multi-WTRU ACK/BA procedure in a target wake time/restricted access window (TWT/RAW) period.

FIG. 9 shows a messaging diagram of an example multi-WTRU ACK/BA procedure 900 in TWT/RAW period. In the example multi-WTRU ACK/BA procedure 900, it is assumed that an AP 905 (the AP 905 may be any WTRU, including a non-AP WTRU) is communicating with WTRUs 901-904 in a WLAN system. The AP 905 may use multi-WTRU ACK/BA for efficient acknowledgement in a TWT or RAW period 920. For example, the AP 905 may indicate in a frame 906 (e.g., a beacon or short beacon frame), that a TWT/RAW period 920 is scheduled. The frame 906 may indicate that the TWT/RAW period 920 is of the type of SU or MU.

The frame 906 may indicate the WTRUs that are allowed to access the medium during the TWT/RAW period 920. The frame 906 may indicate the allocated resources to be used during the TWT/RAW period 920. The frame 906 may further indicate that the TWT/RAW period 920 will use multi-WTRU ACK/BA for acknowledgement. The frame 906 may also indicate that the AP 905 is scheduled to transmit one or more multi-WTRU ACK/BA frames (e.g., multi-WTRU ACK/BA frames 914, 916, and 918) during the TWT/RAW period 920 (e.g., an indication of the number of multi-WTRU ACK/BA frames that the AP 905 may transmit during the TWT/RAW period 920). The targeted time of transmission $t_1$, $t_2$, and $t_3$, of the multi-WTRU ACK/BA frames 914, 916, and 918, may be indicated, for example in terms of absolute time, or an offset from a reference time, such as an offset of the transmission of the current frame 906 or the start of the TWT/RAW period 920. The targeted time of transmission $t_1$, $t_2$, and $t_3$ of the multi-WTRU ACK/BA frames 914, 916, and 918 may be assigned to one or more slots.

A TWT/RAW period 920 may commence with the transmission of a frame 908 by a WTRU, such as the AP 905. The frame 908 may be a (short) beacon or trigger frame, resource allocation frame, an NDP frame, or part of a MU frame, for example. The frame 908 may indicate the TWT/RAW period 920 may be of the type of SU or MU. The frame 908 may indicate the WTRUs that are allowed to access the medium during the TWT/RAW period. The frame 908 may indicate the allocated resources to be used during the TWT/RAW period 920. The frame 908 may indicate that the TWT/RAW will use multi-WTRU ACK/BA for acknowledgement. The frame 908 may indicate that the AP 905 is scheduled to transmit one or more multi-WTRU ACK/BA during the TWT/RAW period 920. The targeted time of transmission $t_1$, $t_2$, and $t_3$ of the multi-WTRU ACK/BA frames 914, 916, and 918 may be indicated in terms of absolute time, an offset from a reference time, such as an offset from the end of the transmission of the current frame or start of the TWT/RAW period 920. The targeted time of transmission $t_1$, $t_2$, and $t_3$ of the multi-WTRU ACK/BA frames 914, 916, and 918 may be assigned to one or more slots.

During the TWT/RAW period 920, WTRUs 901-905 that are allowed to access the medium (e.g., channel(s)) may transmit frames to their destinations. Such transmissions may take place in assigned slots over allocated resources. For example, WTRU 901 may send frame 910 to AP 905, and WTRU 903 may send frame 912 to AP 905. Frames 910 and 912 may include BAs to AP 905. In an example, the WTRUs 901 and 903 may indicate that the ACK type is multi-WTRU ACK/BA when transmitting frames 910 and 912. After completing the transmissions of frames 910 and 912, the WTRUs 901 and 903 (or any of the WTRUs 901-905) may sleep or doze until the targeted time of transmission $t_1$, $t_2$, and $t_3$ of the multi-WTRU ACK/BA frames 914, 916, and 918. The recipient WTRU of the frames 910 and 912, which is the AP 905 in this example, may respond with multi-WTRU ACK/BA frames 914, 916, and 918 at the targeted transmission times $t_1$, $t_2$, and $t_3$ to acknowledge the packets that the AP 905 has received. If the medium is busy, the AP 905 may delay transmitting any of the multi-WTRU ACK/BA frames 914, 916, and/or 918, until the AP 905 has access to the medium. In an example, the AP 905 may attempt the transmission of a multi-WTRU ACK/BA frame 914, 916, and/or 918 at each of the respective targeted transmission times $t_1$, $t_2$, and $t_3$, without taking into account any delays in transmitting the previous multi-WTRU ACK/BA frames.

If after transmitting a WTRU, for example WTRU 901 or WTRU 903, determines that one or more of its frames have not been acknowledged by the receiving WTRU, such as the AP 905, in a received multi-WTRU ACK/BA frame 914, 916, or 918, the WTRU may retransmit the unacknowledged frames the next time that the WTRU is allowed to access the medium. If a WTRU, for example WTRU 901 or WTRU 903, after transmitting a frame does not receive a multi-WTRU ACK/BA frame from the recipient WTRU (e.g., AP 905), the WTRU 901 or 903 may retransmit the unacknowledged frames the next time that the WTRU is allowed to access the medium. In an example, the WTRU, for example WTRU 901 or WTRU 903, may transmit a block acknowledgement request (BAR) or multi-WTRU BAR (not shown), to the receiving WTRU (e.g., AP 905), as a part of the transmissions to the receiving WTRU to request acknowledgment.

Figure 10:
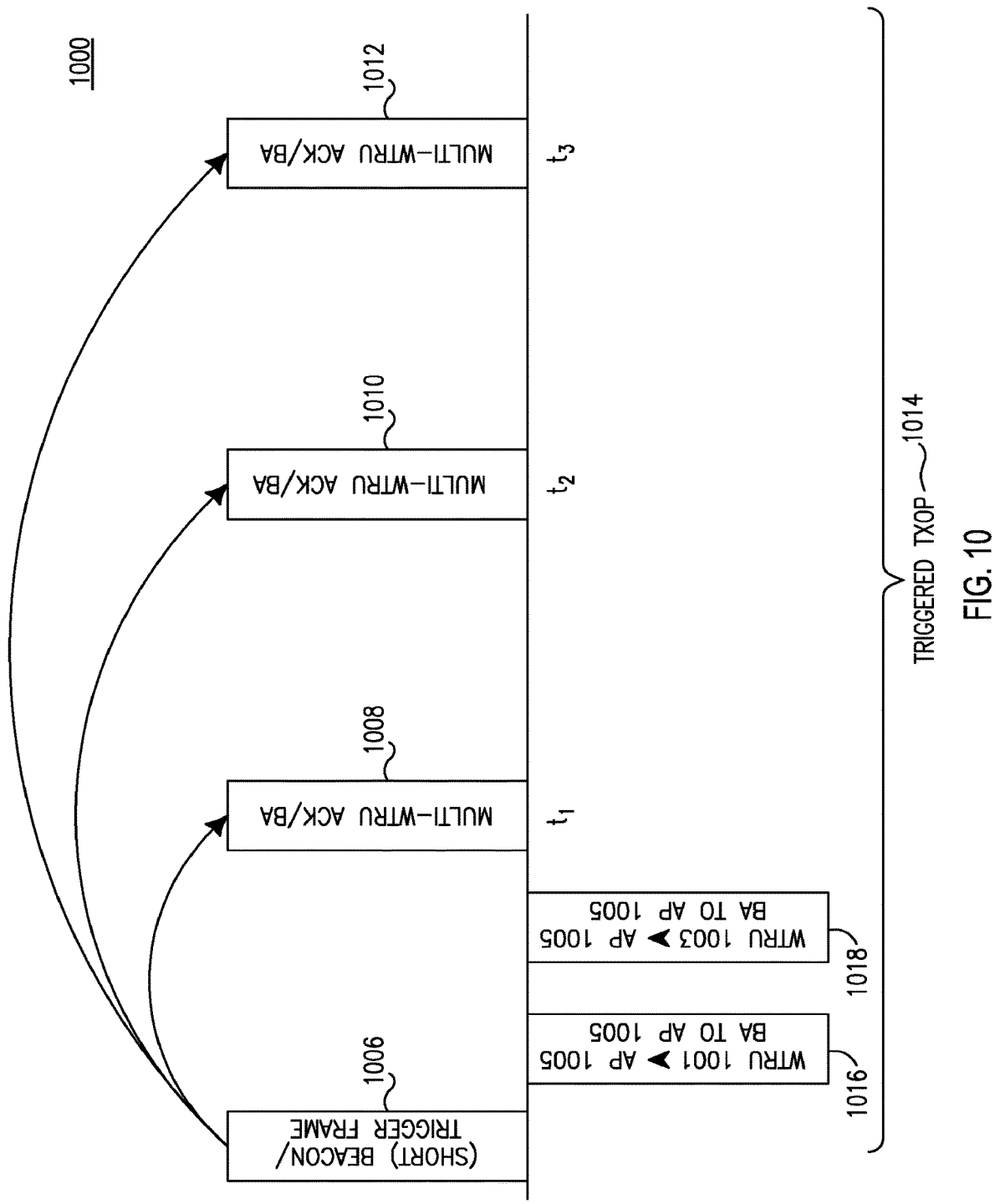
FIG. 10 shows a messaging diagram of an example multi-WTRU ACK/BA procedure in a triggered transmission opportunity (TXOP) period.

According to an example, multi-WTRU ACK/BA procedures may be used in conjunction with triggered TXOP. FIG. 10 shows a messaging diagram of an example multi-WTRU ACK/BA procedure 1000 in a triggered TXOP period 1014. WTRUs 1001-1005, where WTRU 1005 may be an AP, may use multi-WTRU ACK/BA mechanisms in triggered TXOP period 1014.

A triggered TXOP period 1014 may be started by a frame 1006 transmitted by a WTRU, for example, the AP 1005. The frame 1006 may be a (short) beacon or trigger frame, a resource allocation frame, an NDP frame, part of a MU frame, or any other type of frames, for example. The frame 1006 may include an indication that the triggered TXOP period 1014 is of the type of SU or MU. The frame 1006 may indicate the WTRUs (e.g., WTRUS 1001-1005) that are allowed to access the medium during the triggered TXOP period 1014. The frame 1006 may indicate the allocated resources to be used during the triggered TXOP period 1014. The frame 1006 may indicate that the triggered TXOP period 1014 will use multi-WTRU ACK/BA for acknowledgement of received frames. The frame 1006 may indicate that the AP 1005 is scheduled to transmit one or more multi-WTRU ACK/BA during the triggered TXOP period 1014. The targeted time of transmission $t_1$, $t_2$, and $t_3$ of the multi-WTRU ACK/BA frames 1008, 1010, and 1012, may be indicated in terms of absolute time, TSF timer, an offset from a reference time, such as an offset from the end of the transmission of the current frame 1006 or the start of the triggered TXOP 1014. The targeted time of transmission $t_1$, $t_2$, and $t_3$ of the multi-WTRU ACK/BA frames 1008, 1010, and 1012 may also be assigned to one or more slot.

During the trigged TXOP period 1014, WTRUs that are allowed to access the medium (e.g., WTRUs 901-905) may transmit frames to their destinations. For example, WTRU 1001 may transmit frame 1016 to AP 1005, and WTRU 1003 may transmit frame 1018 to AP 1005. Frames 1016 and 1018 may include BAs to the AP 1005. Frame transmissions 1016 and 1018 may take place in assigned slots over allocated resources. The WTRUs 1001 and 1003 may indicate that the ACK type is multi-WTRU ACK/BA (e.g., M-BA) in frames 1016 and 1018. After completing frame transmissions 1016 and 1018, the WTRUs 1001 and 1003 (or any other active WTRUs) may sleep or doze until the targeted transmission times $t_1$, $t_2$, and $t_3$ of the multi-WTRU ACK/BA frames 1008, 1010, and 1012. The responding WTRUs that are receive frames 1016 and 1018, for example the AP 1005 in this example, may respond by transmitting multi-WTRU ACK/BA frames 1008, 1010, and 1012 for the packets that it has received at the targeted transmission times $t_1$, $t_2$, and $t_3$. If the medium is busy, the AP 1005 may delay transmitting any of the multi-WTRU ACK/BA frames 1008, 1010, and 1012 until the AP 1005 has access to the medium. In another example, the AP 1005 may attempt the transmission of multi-WTRU ACK/BA frames 1008, 1010, and 1012 at any or each of the targeted transmission times $t_1$, $t_2$, and $t_3$, without taking into account any delays in transmitting the previous multi-WTRU ACK/BA frames.

If, after transmitting, a WTRU, for example WTRU 1001 and/or 1003, determines that one or more of its transmitted frames 1016 and/or 1018 have not been acknowledged by the receiving WTRU (AP 1005) in a received multi-WTRU ACK/BA frame 1008, 1010, and/or 1012, the WTRU may retransmit the unacknowledged frames the next time that the WTRU is allowed to access the medium. If a WTRU, for example WTRU 1001 and/or 1003, after transmitting did not receive any multi-WTRU ACK/BA frames, then the WTRU may retransmit the unacknowledged frames the next time that the WTRU is allowed to access the medium. In an example, the WTRU (WTRU 1001 and/or 1003) may transmit a BAR or multi-WTRU BAR (not shown) to the receiving WTRU (AP 1005) as a part of the other transmissions to the receiving WTRU.

Figure 11:
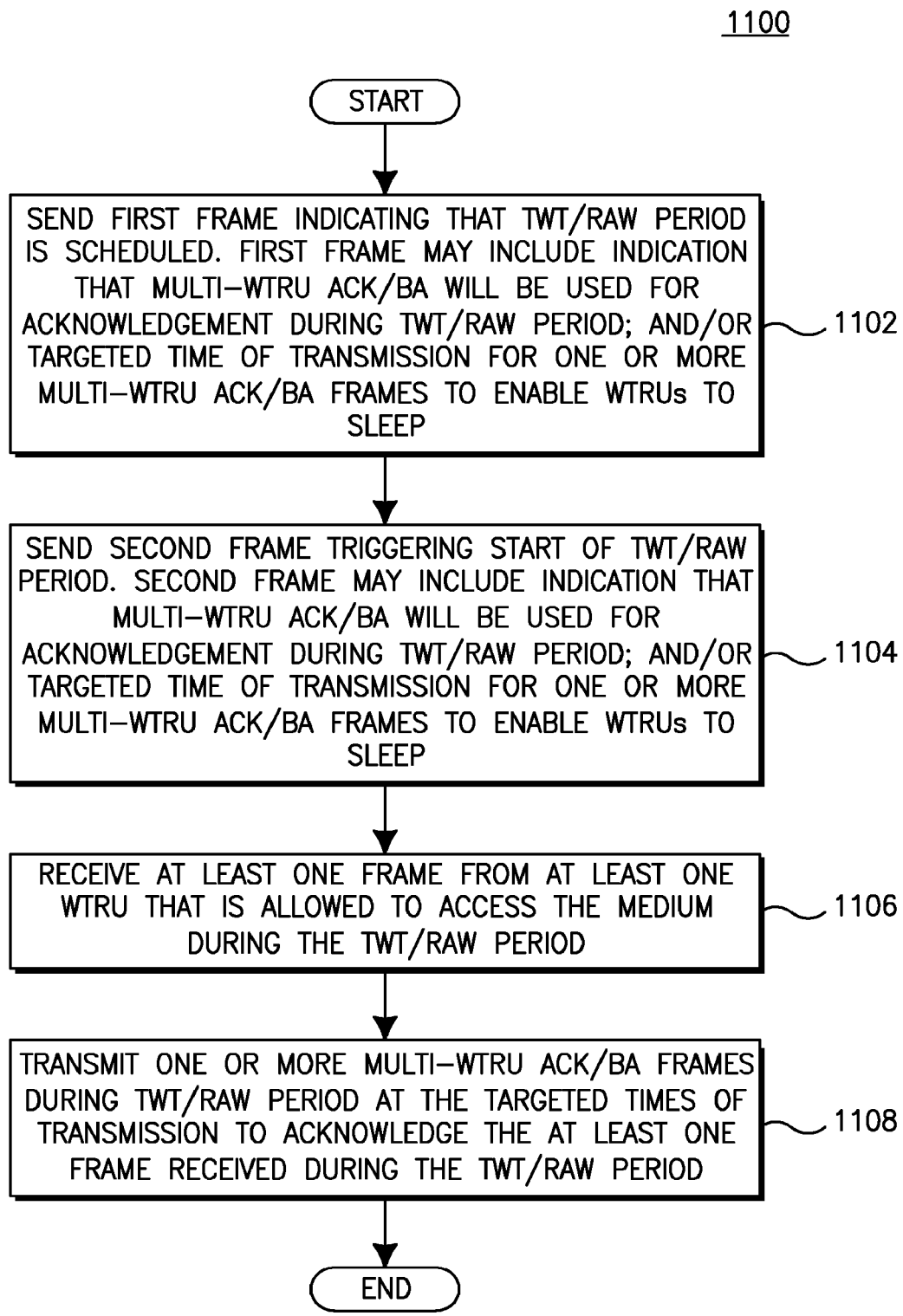
FIG. 11 shows a flow diagram of an example multi-WTRU ACK/BA procedure in a TWT/RAW period.

FIG. 11 shows a flow diagram of an example multi-WTRU ACK/BA procedure 1100 in a TWT/RAW period performed by a WTRU. The example multi-WTRU ACK/BA procedure 1100 may be performed, for example, by an AP in a WLAN system using TWT/RAW procedures. The example multi-WTRU ACK/BA procedure 1100 may correspond to the example multi-WTRU ACK/BA procedure 900 in FIG. 9, and as such may include any subset of the features or elements described with respect to FIG. 9.

With reference to FIG. 11, at 1102, an AP may send a first frame indication that the TWT/RAW period is scheduled. (This first frame may be, for example, frame 906 in FIG. 9.) The first frame may include an indication that multi-WTRU ACK/BA will be used for acknowledgement during the TWT/RAW period. The first frame may include targeted time of transmission for one or more multi-WTRU ACK/BA frames. The indication of target times of transmission may enable other WTRUs to sleep or doze when acknowledgement is not expected and when not transmitting otherwise.

At 1104, the AP may send a second frame triggering the start of the TWT/RAW period. (This second frame may be, for example, frame 908 in FIG. 9.) In addition or alternatively to the information included in the first frame, the second frame may include an indication that multi-WTRU ACK/BA will be used for acknowledgement during the TWT/RAW period, and/or the targeted time of transmission for one or more multi-WTRU ACK/BA frames. At 1106, the AP may receive at least one frame from at least one WTRU that is allowed to access the medium during the TWT/RAW period. (This at least one frame may be, for example, frames 910 and 912 in FIG. 9.) At 1108, the AP may transmit one or more multi-WTRU ACK/BA frames during the TWT/RAW period at the targeted times of transmission to acknowledge the at least one frame received during the TWT/RAW period. (The one or more multi-WTRU ACK/BA frames may be, for example, frames 914, 916 and 918 in FIG. 9.) The example multi-WTRU ACK/BA procedure 1100 may be repeated in each TWT/RAW period.

Although the features and elements of the present invention are described in the preferred embodiments in particular combinations, each feature or element may be used alone without the other features and elements of the preferred embodiments or in various combinations with or without other features and elements of the present invention. Although the solutions described herein consider 802.11 specific protocols, it is understood that the solutions described herein are not restricted to this scenario and are applicable to other wireless systems as well. Although SIFS is used to indicate various inter frame spacing in the examples of the designs and procedures, all other inter frame spacing such as RIFS or other agreed time interval could be applied in the same solutions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, STA, AP, terminal, base station, RNC, or any host computer.

What is claimed is:

1. A non-access point (AP)-station (STA) operating in a wireless local area network (WLAN), the non-AP STA comprising:
   a transceiver, coupled to a processor, the transceiver and the processor configured to communicate, in an operation mode, with devices in the WLAN including another STA;
   the transceiver configured to transmit, to the another STA, one or more of a data frame or a management frame including a medium access control (MAC) header, the MAC header including an operation mode field indicating a change in one or more parameters of the operation mode, the one or more parameters including: a number of spatial streams supported by the STA, an operating bandwidth supported by the STA, or a single-user (SU) or multi-user (MU) capability of the STA; and
   the transceiver configured to transmit or receive, based on a determination that the indicated change in the one or more parameters of the operation mode has taken effect, a frame to or from the another STA in accordance with the indicated change in the one or more parameters of the operation mode.

2. The STA of claim 1, the transceiver and the processor configured to transmit, in accordance with the indicated SU or MU capability of the STA, a SU or MU transmission to the another STA.

3. The STA of claim 1, wherein the received frame is a second frame, and wherein the transceiver configured to receive, from the another STA, a first frame before transmitting the one or more of the data frame or the management frame, and wherein the one or more of the data frame or the management frame are transmitted in response to the received at least one frame.

4. The STA of claim 3, wherein the frame transmitted to the another STA is a management frame, and wherein the management frame is an acknowledgment of the frame received from the another STA.

5. The STA of claim 1, wherein the determination that the indicated change in the one or more parameters of the operation mode has taken effect is based on a determination that a time or delay indicated by the operation mode field has elapsed.

6. The STA of claim 1, wherein the another STA is an AP-STA.

7. A method performed by a non-access point (AP)-station (STA) operating in a wireless local area network (WLAN), the method comprising:
   communicating, in an operation mode, with devices in the WLAN including another STA;
   transmitting, to the another STA, one or more of a data frame or a management frame including a medium access control (MAC) header, the MAC header including an operation mode field indicating a change in one or more parameters of the operation mode, the one or more parameters including: a number of spatial streams supported by the STA, an operating bandwidth supported by the STA, or a single-user (SU) or multi-user (MU) capability of the STA; and
   transmitting or receiving, based on a determination that the indicated change in the one or more parameters of the operation mode has taken effect, a frame to or from the another STA in accordance with the indicated change in the one or more parameters of the operation mode.

8. The method of claim 7 comprising transmitting, in accordance with the indicated SU or MU capability of the non-AP STA, a SU or MU transmission to the another STA.

9. The method of claim 7, wherein the received frame is a second frame, and wherein the transceiver configured to receive, from the another STA, a first frame before transmitting the one or more of the data frame or the management frame, and wherein the one or more of the data frame or the management frame are transmitted in response to the received at least one frame.

10. The method of claim 9, wherein the frame transmitted to the another STA is a management frame, and wherein the management frame is an acknowledgment of the frame received from the another STA.

11. The method of claim 7, wherein the determination that the indicated change in the one or more parameters of the operation mode has taken effect is based on a determination that a time or delay indicated by the operation mode field has elapsed.

12. The method of claim 7, wherein the another STA is an AP-STA.

13. An access point (AP)-station (STA) operating in a wireless local area network (WLAN), the AP-STA comprising:
- a transceiver, coupled to a processor, the transceiver and the processor configured to communicate, in an operation mode, with devices in the WLAN including another STA;
- the transceiver configured to receive, from the another STA, one or more of a data frame or a management frame including a medium access control (MAC) header, the MAC header including an operation mode field indicating a change in one or more parameters of the operation mode, the one or more parameters including: a number of spatial streams supported by the STA, an operating bandwidth supported by the STA, or a single-user (SU) or multi-user (MU) capability of the STA; and
- the transceiver configured to transmit or receive a frame to or from the another STA in accordance with the indicated change in the one or more parameters of the operation mode.

14. The STA of claim 13, the transceiver and the processor configured to receive, in accordance with the indicated SU or MU capability of the STA, a SU or MU transmission to the another STA.

15. The STA of claim 13, wherein the transmitted or received frame is a second frame, and wherein the transceiver configured to transmit, to the another STA, a first frame before receiving the one or more of the data frame or the management frame, and wherein the one or more of the data frame or the management frame are received in response to the received at least one frame.

16. The STA of claim 15, wherein the frame transmitted to the another STA is a management frame, and wherein the management frame is an acknowledgment of the frame received from the another STA.

17. The STA of claim 13, wherein the transmission or reception of the frame is performed based on a determination that the indicated change in the one or more parameters of the operation mode has taken effect, wherein the determination that the indicated change in the one or more parameters of the operation mode has taken effect is based on a determination that a time or delay indicated by the operation mode field has elapsed.

18. The STA of claim 13, wherein the another STA is a non-AP-STA.

* * * * *